(12) United States Patent
Lustyk et al.

(10) Patent No.: US 11,210,683 B2
(45) Date of Patent: *Dec. 28, 2021

(54) DETECTION AND MITIGATION OF EFFECTS OF HIGH VELOCITY VALUE CHANGES BASED UPON MATCH EVENT OUTCOMES

(71) Applicant: Chicago Mercantile Exchange Inc., Chicago, IL (US)

(72) Inventors: Neil A. Lustyk, Lisle, IL (US); John Scheerer, Frankfort, IL (US); James Bailey, Hanover Park, IL (US); Paul Millhuff, Tinley Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,577

(22) Filed: Aug. 13, 2020

(65) Prior Publication Data

US 2020/0372523 A1 Nov. 26, 2020

Related U.S. Application Data

(63) Continuation of application No. 15/091,626, filed on Apr. 6, 2016, now Pat. No. 10,783,532.

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06Q 40/04* (2013.01); *G06Q 40/00* (2013.01); *G06Q 40/025* (2013.01)

(58) Field of Classification Search
CPC .... G06Q 30/0201; G06Q 40/04; G06Q 40/00; G06Q 40/025
(Continued)

(56) References Cited

U.S. PATENT DOCUMENTS 4,903,201 A 2/1990 Wagner
4,980,826 A 12/1990 Wagner
(Continued)

FOREIGN PATENT DOCUMENTS

JP 2002-183446 6/2002

OTHER PUBLICATIONS

"Exchange News 2001", ASE.com, Effective Apr. 15, 2001, Available at http://www.ase.com.jo/en/exchange-news-2001.
(Continued)

*Primary Examiner* — Sun M Li
(74) *Attorney, Agent, or Firm* — Lempia Summerfield Katz LLC

(57) ABSTRACT

A processing module may be centralized and coupled to multiple inputs from customers, and behave deterministically, e.g., programmed to depend on state, inputs and outputs. The rapid speed of automated trading systems implementing such a centralized, deterministic module, where all users can access a central limit order object, can quickly result in an object state that does not reflect a true consensus or desirable state. Accordingly the resulting problem is a problem arising in computer systems due in part to the high speeds of computer systems. The solutions disclosed herein are, in one embodiment, implemented as automatic responses and actions by a computing system.

30 Claims, 8 Drawing Sheets

(51) Int. Cl.
  *G06Q 40/04* (2012.01)
  *G06Q 40/00* (2012.01)
  *G06Q 40/02* (2012.01)
(58) Field of Classification Search
  USPC ........................................................ 705/7.29
  See application file for complete search history.

(56) References Cited

U.S. PATENT DOCUMENTS

| | | | |
|---|---|---|---|
| 6,016,483 | A | 1/2000 | Rickard et al. |
| 6,405,180 | B2 | 6/2002 | Tilfors et al. |
| 6,418,419 | B1 | 7/2002 | Nieboer et al. |
| 6,772,132 | B1 | 8/2004 | Kemp, II et al. |
| 7,082,410 | B1 | 7/2006 | Anaya et al. |
| 7,099,839 | B2 | 8/2006 | Madoff et al. |
| 7,356,499 | B1 | 4/2008 | Amburn |
| 7,430,533 | B1 | 9/2008 | Cushing |
| 7,835,972 | B2 | 11/2010 | Almeida et al. |
| 7,908,204 | B2 | 3/2011 | Boglaev |
| 8,103,576 | B2 | 1/2012 | Farrell et al. |
| 8,112,347 | B2 | 2/2012 | Farrell et al. |
| 8,296,220 | B2 | 10/2012 | Almeida et al. |
| 8,560,418 | B2 | 10/2013 | Zagara et al. |
| 8,666,875 | B1 | 3/2014 | Scheerer et al. |
| 8,751,363 | B2 | 6/2014 | Cushing et al. |
| 8,924,278 | B2 | 12/2014 | Farrell et al. |
| 2001/0032163 | A1 | 10/2001 | Fertik et al. |
| 2001/0042036 | A1 | 11/2001 | Sanders |
| 2001/0047308 | A1 | 11/2001 | Kaminsky et al. |
| 2001/0049651 | A1 | 12/2001 | Selleck |
| 2002/0019795 | A1 | 2/2002 | Madoff et al. |
| 2002/0073018 | A1 | 6/2002 | Mulinder et al. |
| 2002/0103742 | A1 | 8/2002 | Billings et al. |
| 2002/0156718 | A1 | 10/2002 | Olsen et al. |
| 2003/0069830 | A1 | 4/2003 | Morano et al. |
| 2004/0073438 | A1 | 4/2004 | Fox et al. |
| 2004/0210504 | A1 | 10/2004 | Rutman |
| 2005/0049956 | A1 | 3/2005 | Ballman |
| 2005/0075965 | A1 | 4/2005 | Cutler |
| 2005/0075966 | A1 | 4/2005 | Duka |
| 2005/0108141 | A1* | 5/2005 | Farrell .................. G06Q 40/04 705/37 |
| 2005/0283423 | A1 | 12/2005 | Moser et al. |
| 2006/0167779 | A1 | 7/2006 | Turner |
| 2006/0173764 | A1 | 8/2006 | Costakis et al. |
| 2007/0005481 | A1 | 1/2007 | Kedia et al. |
| 2008/0015970 | A1 | 1/2008 | Brookfield et al. |
| 2009/0063358 | A1 | 3/2009 | Smith |
| 2010/0017321 | A1* | 1/2010 | Callaway ............... G06Q 40/04 705/37 |
| 2010/0121759 | A1 | 5/2010 | Waelbroeck et al. |
| 2010/0287114 | A1 | 11/2010 | Bartko et al. |
| 2011/0060677 | A1 | 3/2011 | Almeida et al. |
| 2011/0276459 | A1 | 11/2011 | Cushing et al. |
| 2011/0320338 | A1 | 12/2011 | Farrell et al. |
| 2012/0011044 | A1 | 1/2012 | Vasinkevich |
| 2012/0022997 | A1 | 1/2012 | Vasinkevich |
| 2012/0166329 | A1 | 6/2012 | Kline et al. |
| 2013/0185187 | A1 | 7/2013 | Vasinkevich |
| 2013/0218740 | A1* | 8/2013 | Lutnick .................. G06Q 40/00 705/37 |
| 2015/0170273 | A1 | 6/2015 | Barry et al. |

OTHER PUBLICATIONS

"Self-Regulatory Organizations; Notice of Filing of Proposed Rule Change . . . Relating to the Establishment of Trade and Quote Halt Authority for the NADS's OTCBB Service", Securities and Exchange Commission Release No. 34-42345, Jan. 18, 2000, File No. SR-NASA-99-33.
"User Manual of the Securities Trading System", Amman Stock Exchange, retrieved Oct. 11, 2012, http://194.165.154.74/ar/printpdf/node/1606.
"What is Conditional Order? Definition and Meaning", retrieved Oct. 11, 2012, http://www.investorwords.com/7580/conditional_order.html.
Aitken and Berry, "Surveillance Literature . . . Market Surveillance at the Australian Stock Exchange: An Overview", 5th Draft, Jul. 1991, pp. 1-21.
Amihud et al., "Stock Market Microstructure and Return Volatility", Journal of Banking and Finance 14, 1990, pp. 423-440.
Appleby, Spurling & Kempe, "Bye-Laws of the International Futures Exchange (Bermuda) Limited", Jul. 8, 1981, 54 pages.
Ardon, et al., "A Planning Report for the Toronto Stock Exchange", Jun. 1969, 44 pages.
Ardron, J.M., "Current Status on CATS", Apr. 1, 1977, pp. 1-3.
Ardron, M., "CATS Status Overview", Mar. 17, 1977, pp. 1-5.
ASE.com, "Exchange News 2001," http://www.ase.com.jo/en/exchange-news-2001, effective Apr. 15, 2001.
Barish and Siff, "Operational Gaming Simulation With Application To A Stock Market," Management Science, Journal of the Institute of Management Sciences, vol. 15, No. 10, Jun. 1969, pp. B-530-B-541.
Batten, William M., "The ABC's of the ABS", Nov. 22, 1977, pp. 1-15.
Blain Reinkensmeyer, "Using Trailing Stop Orders with your Online Broker", Stocktrader.com, May 24, 2007.
Blain Reinkensmeyer, "Using Trailing Stop Orders with Your Online Broker," May 24, 2007, accessed May 31, 2011.
Bleiberg, Robert M., "Market Winner, Financial Futures Have Scored Remarkable Gains," Barron's National Business and Financial Weekly, Dow Jones & Company, Inc., Nov. 30, 1981, p. 7.
Blume, Siegel and Rottenberg, Revolution on Wall Street, The Rise and Decline of the New York Stock Exchange, "Chapter 11: Technology and the Marketplace", W.W. Norton & Company, New York and London, 1993, pp. 192-214.
Brown, Sidney, "Electronic Commodities market to Operate Offshore", Dollar, The International Journal of American Investments, May 1982, 1 page.
Carrington, "Computer Linkups Letting Traders Start Up Securities Firms at Home," The Wall Street Journal, Wednesday, Dec. 9, 1981, p. 33.
Cleland, H., "Draft Appendix D: Outline of Method and Criteria for Evaluation of Cats as a Mechanism to Replace the TSE Trading Floor-Possible Schedule for Implementation", Jun. 3, 1976, Part I and Part II, 10 pages.
CME Direct, Broker User Manual, CME Group, 131 pages, Jun. 12, 2013.
CME Direct, Trader User Manual, CME Group, 107 pages, Jun. 12, 2013.
Commodity Futures Law Reporters, Futures Trading Act of 1982, No. 175, Jun. 7, 1982, 248 pages.
Corwin, "Order Flow and Liquidity Around NYSE Trading Halts", The Journal of Finance, 2000, vol. LV, No. 4.
Dunne, Nancy, "Dawn of Electronic Age For Futures", London Financial Times, Wednesday, Dec. 23, 1981, p. 1.
Ettorre, Barbara, "Faces Behind The Figures", Forbes, Aug. 30, 1982, p. 139.
Excerpt from CME's 2002 Rulebook, Chapter 5 Floor Privileges—Trading Qualifications and Practices, printed Jan. 2, 2003, pp. 10-21.
French and Roll, "Journal of Financial Economics the Arrival of Information and Reaction of Traders", Stock Return Variances Elsevier Science Publishers B.V. (North Holland), 1986, pp. 5-27.
Fukushima: "Method of Matching Orders and Price Volatility in JGB Futures Market" 2001 the 9th Conf. of Nippon Finance Assoc Draft Report, Jun. 3, 2001, pp. 303-316.
Fuller and Simon, "The National Market System in Perspective: A Selective Outline of Significant Events", May 15, 1978, 56 pages.
Fuller, James W., et al., "Outlook for the U.S. Securities Industry 1981", vol. II, Final Report, Jun. 1977, Chapters 1-11, 414 pages.
Gampetro, Tony, INTEX Gearing up for Autumn Opening, Financial Futures Focus, Commodities, p. 7A.
Gampetro, Tony, "Intex Unveils Trade Contracts", Journal of Commerce, Thursday, Aug. 5, 1982, p. 1.

(56) References Cited

OTHER PUBLICATIONS

Garman, Mark B., "A Description of an Experimental Securities Exchange" University of California, Berkeley, Mar. 1975, revised Oct. 1975, pp. 1-17 and Appendix pp. 1-3.
Hamao et al., "Securities Trading in the Absence of Dealers: Trades and Quotes on the Tokyo Stock Exchange", Center on Japanese Economy and Business, 1992, vo. 69.
Hamao et al., "Securities Trading in the Absence of Dealers: Trades and Quotes on the Tokyo Stock Exchange", Oxford University Press, the Review of Financial Studies, 1995, pp. 849-878, vol. 8, No. 3.
Harris et al., "Circuit Breakers and Program Trading Limits: What Have We Learned?", Dec. 9, 1997, http://harris.usc.edu/acrobat/circuit.pdf.
Hutchinson, A.M., "Candat Displays For Cats Terminals", Dec. 5, 1974, 6 pages.
ICE Circuit Breakers—IPL Interval Price Limits, Mar. 2012.
International Preliminary Report on Patentability from, PCT/US2013/57918, Jun. 2, 2015, WO.
International Search Report and Written Opinion in Application No. PCT/US04/22661, dated Aug. 29, 2005, 8 pages.
International Search Report in related Application No. PCT/US2008/075974 dated Nov. 21, 2008.
International Search Report in related Application No. PCT/US2008/075980 dated Nov. 21, 2008.
Isaka: "Mechanism for Recovery of Liquidity After Large-Scale Macro Shock—Tokyo Stock Exchange just after 9/11" the 11th Conference of Nippon Finance Assoc Draft Report, Jun. 7, 2003, pp. 317 to 331 (with translation).
Japanese Office Action (and English translation) from Japanese Application No. 2010-228625 dated Oct. 16, 2012.
John McCrank, "ICE Circuit Breakers Aim to Stop Trading Gone Wild," Reuters, 2 pages, Mar. 12, 2012.
Kengo Fukamachi: The American Futures & Options Trading, Toyo Keizai Inc., Jul. 20, 2000, first edition, pp. 70-76.
Lehmann et al., "Market Structure and Liquidity on the Tokyo Stock Exchange", University of Chicago Press, The Industrial Organization and Regulation of the Securities Industry, Jan. 1996, pp. 275-316, vol. 96-1.
Lehmann et al., "Trading and Liquidity on the Tokyo Stock Exchange: A Birds Eye View", Institute of Business and Economic Research, Finance Working Paper No. 234, 1994.
Letter to George A. Fitzsimmons, Securities and Exchange Commission, Apr. 30, 1976, pp. 1-4.
Letter to Harold M. Williams of Securities and Exchange Commission, from MSE Richard B. Walbert, regarding File Nos. S7-735 and S7-759, Nov. 24, 1978, pp. 1-66.
Letter to John S. R. Shad of Securities and Exchange commission, from the Cincinnati Stock Exchange, Dec. 31, 1981, pp. 1-3.
Letter to Martin L. Budd, Security and Exchange Commission, from Peake, Mendelson and Williams, Nov. 4, 1976, 5 pages.
Letter to Mr. Andrew M. Klein of the Securities and Exchange Commission from Weeden & Co., Donald E. Weeden, Oct. 20, 1978, 10 pages.
Letter to Mr. George A. Fitzsimmons of Securities and Exchange Commission, from Securities Industry Association, regarding Development of Order Routing and Market Linage Systems, Aug. 4, 1978, pp. 1-20.
Letter to Mr. George A. Fitzsimmons, Secretary, Securities and Exchange Commission, from K. Richard B. Niehoff, Jul. 24, 1979, 6 pages.
Letter to Mr. Junius W. Peake from Dan W. Schneider, United States Department of Justice, Mar. 22, 1979, 4 pages.
Letter to Mr. Martin L. Budd of National Market Advisory Board, from Peake, Mendelson and Williams, Aug. 20, 1976, pp. 1-6.
Lorie, James H., "Conjectures on the Securities Industry in 1982", Chapter II, pp. 29-39.
Maron, J., "Cats Activities", Dec. 2, 1977, pp. 1-5.
Maron, J., "Cats—Special Terms Market", Oct. 26, 1976, pp. 1-2.
McAvoy, B.J., "Cats Pilot, General Outline for Testing CATS", Feb. 24, 1976, 3 pages.
McAvoy, B.J., "Proposal for Training Cats Users", Feb. 23, 1976, pp. 1-9.
McAvoy, B.J., "Status of Cats", May 31, 1976, 2 pages.
Melamed, Leo, "Automation in the Futures Industry" Proceedings of a Conference Sponsored by Commodity Futures Trading Commission, Jun. 15, 1977, Washington, D.C., pp. 1-2 and 273-283.
Melton, William C., "Corporate Equities and the National Market System," Federal Reserve Bank of New York, vol. 3, No. 4, 1978-79, pp. 13-25.
Melton, William C., "Corporate Equities and the National Market System", FRBNY Quarterly Review/Winter 1978-79, pp. 13-25.
Memo To Mr. J.R. Kimber and Mr. W.L. Somerville, from Mr. M. Ardron, regarding Planning Study for Computer-Assisted Trading (1), Aug. 26, 1969, 4 pages.
Memo to NASDAQ Level II and Level III Subscribers from John H. Hodges, Jr., regarding Commencement of Trade Reporting in NASDAQ national Market System Tier 1 Securities dated Feb. 10, 1982, 2 pages.
Mendelson, Morris, "From Buttonwood to Satellite Via Wall Street", Dec. 1977, pp. 1-33.
Merrill, Lynch, Pierce, Fenner & Smith Incorporated, "Proposal for A National Market System" Oct. 16, 1975, pp. 1-28.
Morris, John, "Bermuda Says Yes to Futures Trading", American Banker, Wednesday, Jul. 8, 1981, 1 page.
Morris, John, "Contracts are Listed for Bermuda's Exchange", American Banker, Oct. 20, 1981, 4 pages.
NASD Recommendations to the SEC on Qualifications for Securities in the National Market System, to Honorable Harold M. Williams from Gordon S. Macklin, Jun. 7, 1978, pp. 8-12.
Notification of Reasons for Rejection, Japanese Patent Office, Application No. 2006-521123, Nov. 10, 2009, 4 pages.
NYSE-IBM Study Years Ago Urged Development of Electronic Trading Arena, Security Week, Nov. 22, 1976, pp. 3-4.
Office Action dated Aug. 8, 2010 in related Japanese Patent Application No. 2006-521123 (3 pages).
O'Toole, Edward T., "Surge in Financial Futures Is Only the Beginning," Dollar, The International Journal of American Investments, May 1982, 4 pages.
Peake, Junius W., "Computers, Competition and Monopoly", Mar. 25-26, 1977, 10 pages.
Peake, Junius W., "Order Flow, Market Making and The National Market System", Mar. 15, 1978, p. 1-7.
Peake, Junius W., "The Investor, the Institution and the National Market System", Jan. 25, 1978, pp. 1-11.
Peake, Junius W., "The Regulatory Role in Systems Development", Mar. 25-26, 1977, p. 1-9.
Peake, Junius W., "The Traderand Automated Execution: Where Is It Leading, and Why?", 1983, p. 1-6.
Peake, Junius W., "The "Crowd", and the National Market System", Jun. 14, 1978, 21 pages.
Peake, Junius W., "Treasury Marketable Securities Systems", Jun. 14, 1983, pp. 1-29.
Peake, Mendelson, and Williams, "The National Book System, An Electrically Assisted Auction Market", (with letter of transmittal to the Securities and Exchange Comm., in response to Release No. 12159/Mar. 2, 1976), Apr. 30, 1976, 105 pages.
Rees, John, "An Exclusive Interview with the Governor of the Pacific Stock Exchange", the Review of the News, Dec. 19, 1979, pp. 31-46.
Report to Mr. K. Richard B. Niehoff from Deloitte Haskins and Sells, Nov. 14, 1978, pp. 1-32.
Sadakazu Osaki: "Review of Circuit Breaker in U.S." Capital Market Quarterly, Winter 1998, Nomura Research Institution, Ltd., Feb. 1, 1998, vol. 1 No. 3. pp. 46-52.
Securities Pacific Links with Intex to Automatic Money Markets, Securities Week, Aug. 2, 1982, 1 page.
Securities Week, Mar. 19, 1979, 2 pages.
Sporleder, Thomas L. and Davis, Ernest E., "Cattlex, A Computerized Cash and Contract Market for Feeder and Stocker Cattle, Operating Procedures and Trading Techniques", Technical Report No. 813, Apr. 1981, 40 pages.

(56) References Cited

OTHER PUBLICATIONS

Susan Lee, "The Battle for a National Market System", Wall Street Journal, Jun. 1, 1982, 1 page.
Teweles and Bradley, "The Stock Market," Fourth Edition, 1982, John Wiley & Sons, Inc., pp. 136-179.
Update, INTEX Press Information, Sep. 20, 1982, 3 pages.
Wall Street Letter, Aug. 2, 1982, p. 3.
Wall Street Letter, Aug. 30, 1982, p. 7.
Wall Street Letter, Nov. 7, 1983, 1 page.
Williams, Arlington W. "Computerized Double-Auction Markets: Some Initial Experimental Results," The Journal of Business, The Graduate School of Business of the University of Chicago, Volume No. 3, Part 1, Jul. 1980, pp. 235-258.
Williams, Harold M., "Progress Toward The Development of A National Market System", 1979, 549 pages.
Williams, Harold M., "The National Market System in Perspective", Dec. 1, 1977, pp. 1-22.
Williams, Harold M., "The National Market System: An Update", News, Securities and Exchange Commission, Oct. 5, 1980, 45 pages.
Williams, Harold M., "The Securities Industry and the National market System: A Current Perspective", News, Securities and Exchange Commission, Nov. 30, 1978, 31 pages.
Williams, Harold M., "The Securities Industry Entering the Eighties: An Economic Overview," news, Securities and Exchange Commission, Nov. 29, 1979, 31 pages.
Witcher, S. Karene, "New Exchange Plans Commodity Trading Through Computers: Intex Won't Have Noisy Floor When It Offers Contracts on Gold and Bonds", Update: The Wall Street Journal, Thursday, Aug. 5, 1982, p. 1.
Written Opinion of the International Searching Authority in related Application No. PCT/US2008/075974 dated Mar. 25, 2010.
Written Opinion of the International Searching Authority in related Application No. PCT/US2008/075980 dated Mar. 25, 2010.
Zyncon Corporation, "Communications Study for World Energy Exchange", Jul. 26, 1983, 21 pages.
"A Feasibility Study for the Toronto Stock Exchange", Jun. 12, 1970, pp. 1-165 and Appendix 1-14.
"A Glossary of Financial Futures Terms", Dollar, The International Journal of American Investments, May 1982, 1 page.
"A Report of Progress on National Market System and Related Developments at the New York Stock Exchange", Nov. 20, 1978, 16 pages.
"An Assessment of Progress Toward the Development of a National Market System", Sep. 24, 1979, pp. 1-20.
"Automated Bond System", The New York Stock Exchange, Automated Bond System, Securities Week, Oct. 1, 1978, 4 pages.
"Automated Bonds System (ABS), User Manual", The New York Stock Exchange, Floor Operations Department, Feb. 27, 1976, 75 pages.
"Automated Trading Concept", The Banker, Apr. 1982, 1 page.
"Cats project Applications Today: Trader Training, Simulated Trading, Live: Stock Trading, Evaluation: Plan and Liming" the Toronto Stock Exchange, Mar. 2, 1976, 4 pages.
"Cats Service and Information Centre," The Toronto Stock Exchange, CATS Project Notice 79-3, Mar. 15, 1979, 175 pages.
"Code of Federal Regulations," Commodity and Securities Exchanges, Apr. 1, 1983, Parts 1-239, pp. 1-322.
"First Annual National Market System Conference", Plaza Hotel New York, Jun. 15-17, 1978, pp. 1-90.
"Good-bye to the pits?, Intex may not put the commodity pits out of business, but lots of members have signed up—just in case it catches on", Financial World, Feb. 28, 1983, pp. 35-37.
"House Scrutinizing Pace of National Market System Formulation," Securities Industry Association, Washington Report, Oct. 1, 1979, p. 1.
"Instructions for Trade Reporting and Entry of Size in the Nasdaq/National Market System", Feb. 1982, 18 pages.
"Interest rate products: Eurodollar bundles", Chicago Mercantile Exchange, http://www.cme.com/products/interest_rate/products_interstrate_ed_bundels.cfm, printed on Feb. 9, 2003, pp. 1-3.
"International Commodities Clearing House Limited, General Regulations for Future Delivery Business and Byelaws for Options", Sep. 6, 1982, 4 pages.
"INTEX Update for Members", Nov. 1982, p. 1.
"INTEX Update for Members", Sep. 15, 1982, pp. 1-2.
"INTEX, This new Exchange is the fastest and most accurate futures trading system anywhere-and it's world-wide. That's INTEX Yes, That's INTEX", Bermuda, Jun. 17, 1982, p. 1.
"Memo to All NASD Members, regarding Commencement of Trade Reporting in National Market System Tier 1 Securities", Feb. 12, 1982, 10 pages.
"National Securities Trading System Review for Securities and Exchange Commission", Apr. 15, 1982, pp. 1-21.
"News Release, The New York Stock Exchange, NYSE Chairman Cites Progress on National Market System", Sep. 24, 1979, pp. 1-6.
"Regulations, The International Futures Exchange (Bermuda) Ltd.", Jan. 15, 1983, 87 pages.
"Remarks by W. Batten, Chairman, NYSE, Before the Committee on Oversight and Investigations and the Subcommittee on Consumer Protection and Finance of the committee on Interstate and Foreign Commerce of the House of Rep.", Sep. 24, 1979, pp. 1-6.
"Report to Members-TSE Project to Investigate Computer Assisted Trading", The Toronto Stock Exchange Notice to Members No. 1827, Feb. 14, 1979, 11 pages.
"SEC Clears Cincinnati Exchange to Offer First All-Electronic Stock Trading in U.S ", The Wall Street Journal, Tuesday, Apr. 11, 1978, p. 1.
"Stmnt of the Amer. Stock Exchange, Before the Joint Hearings of the House Subcmtee on Oversight and Invest. and the House Subcommittee on Consumer Protection and Finance on the Dvlpmnt of a Nat'l Market System", 9-24-979, 13 pages.
"Testimony of K. Richard B. Niehoff, President of Cincinnati Stock Exchange", Washington, D.C., Sep. 24, 1979, pp. 1-10.
"The Emerging National Market System", Feb. 7, 1977, 2 pages.
"The U.S. National Market System: Progress, Problems, and Issues", Remarks by William M. Batten, Nov. 13, 1980, pp. 1-23.
"Want to Play the Market? Try Index Futures", Dollar, The International Journal of American Investments, May 1982, 1 page.
"Why The Big Players Want a Piece of Instinet", Money & Markets Fortune, Aug. 19, 1985, p. 1.

\* cited by examiner

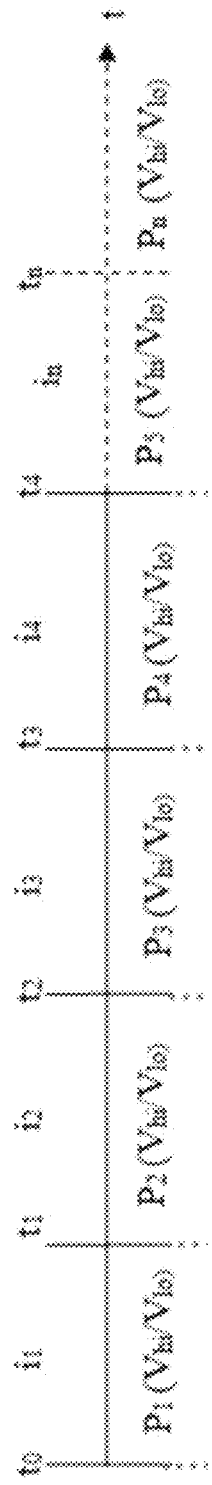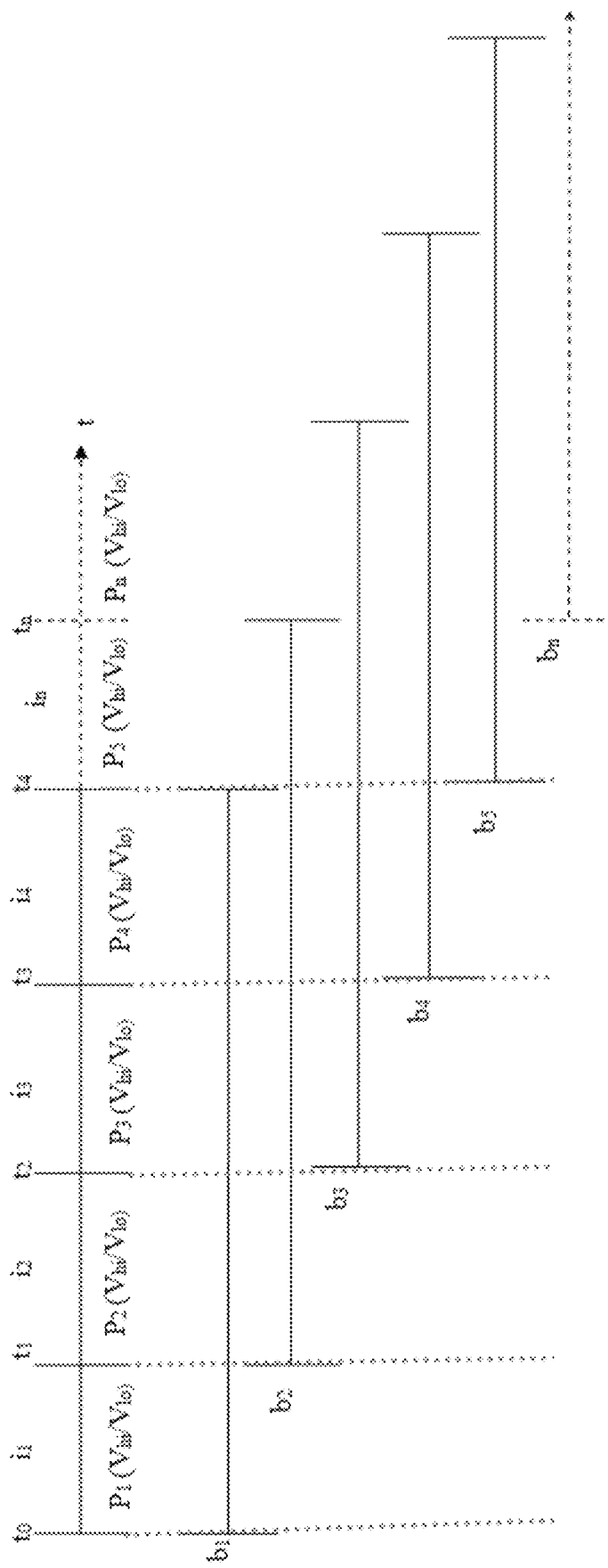
Fig. 3A
Fig. 3B

DETECTION AND MITIGATION OF EFFECTS OF HIGH VELOCITY VALUE CHANGES BASED UPON MATCH EVENT OUTCOMES

PRIORITY CLAIM

This application claims priority to and the benefit as a continuation of U.S. patent application Ser. No. 15/091,626, filed Apr. 6, 2016, entitled, "DETECTION AND MITIGATION OF EFFECTS OF HIGH VELOCITY VALUE CHANGES BASED UPON MATCH EVENT OUTCOMES", now U.S. Pat. No. 10,783,532, issued Sep. 22, 2020, the entirety of which is herein incorporated by reference and relied upon.

BACKGROUND

Computing systems, such as data transaction processing systems, often process data objects which are associated with values derived from or otherwise submitted or provided by external sources. Incoming messages related to the data objects may include requests for transactions which perform actions on the data objects at specified values. Whether or not the attempted actions are executed or performed depend in part on the values submitted with the incoming messages and/or the rules and processing routines programmed into a data transaction processing system.

One example of an environment including data objects having specified values is an electronic trading system wherein the values may be submitted by participants, e.g. traders. Electronic trading systems include objects having values associated therewith. Object values may change over time, and some changes to the value of an object may be undesirable or based on incomplete or inaccurate data. Some detection mechanisms, such as velocity logic detection systems, prevent undesirable changes in values over time (e.g., an undesirable "acceleration"). Other detection mechanisms, such as stop logic detection systems, prevent undesirable gaps between reference and received or incoming values. However, these detection systems may not detect all undesirable situations within a data transaction processing system, such as that implemented, for example, in electronic trading systems.

To mitigate risk and ensure a fair and balanced market, electronic trading systems need to provide mechanisms to rapidly detect and respond to situations where a market is not operating in a fair and balanced manner or otherwise where the market value is not reflective of a true consensus of the value of the traded products among the market participants.

BRIEF DESCRIPTION OF THE DRAWINGS

FIG. 3A depicts representations of the operation of the disclosed embodiments.

FIG. 3B depicts representations of the operation of the disclosed embodiments.

DETAILED DESCRIPTION

Figure 1A:
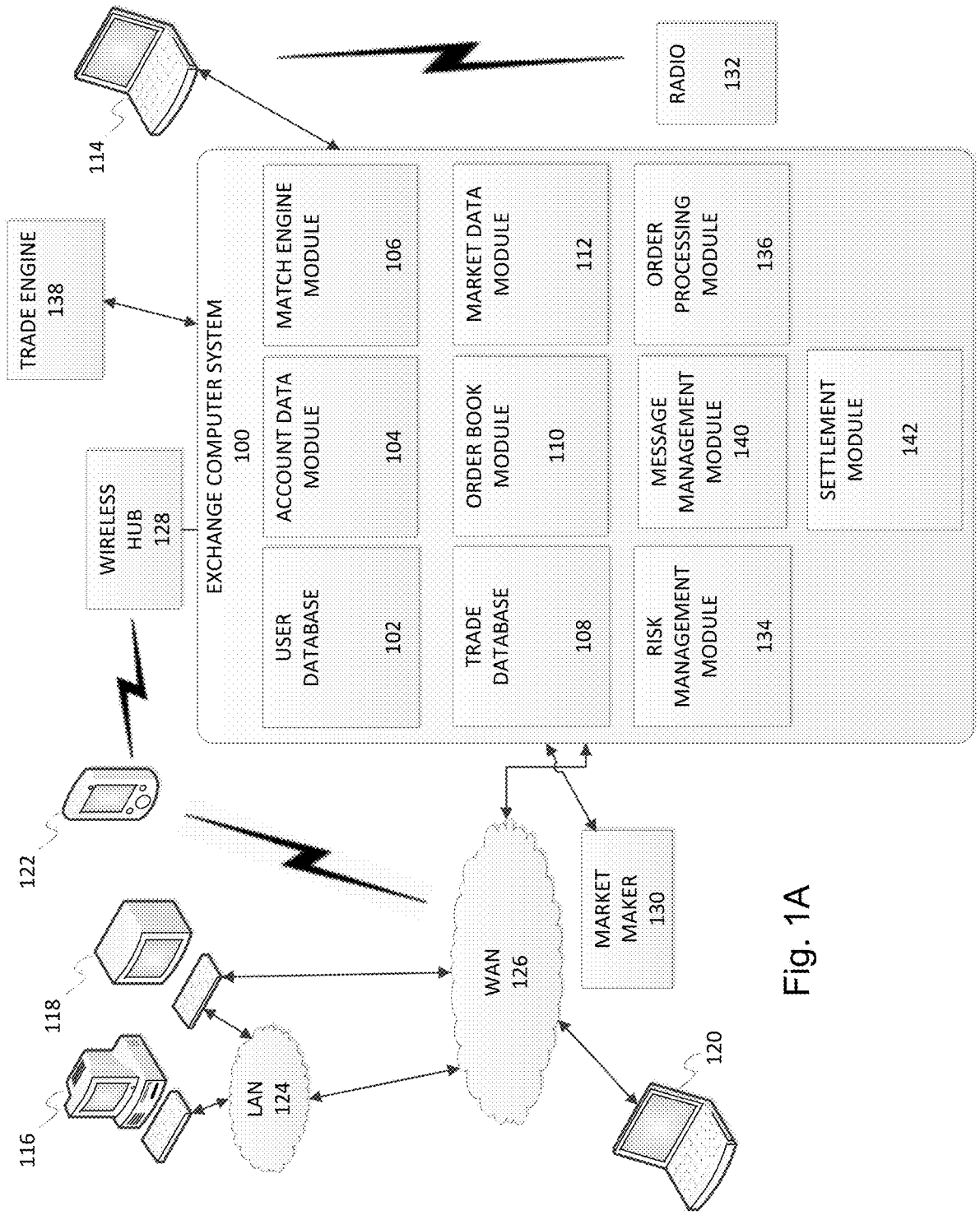
FIG. 1A depicts an illustrative computer network system that may be used to implement aspects of the disclosed embodiments.

The disclosed embodiments relate generally to mechanisms for rapidly detecting and responding to situations where objects in a computing system are associated with values or change in values that are outside of acceptable ranges over one or more time intervals. For example, one exemplary environment where high velocity value detection and mitigation is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Current financial instrument trading systems allow traders to submit orders and receive confirmations, market data, and other information electronically via a network. These "electronic" marketplaces have largely supplanted the pit based trading systems whereby the traders, or their representatives, all physically stand in a designated location, i.e. a trading pit, and trade with each other via oral and hand based communication. Anyone standing in or near the trading pit may be privy to the trades taking place, i.e. both who is trading and what they are trading, allowing, for example, one participant to derive and/or undermine another participant's trading strategy and thereby garner an unfair advantage or otherwise skew the market. Electronic trading systems, in contrast, ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

The speed at which trades are executed through electronic trading systems provide many benefits. Electronic trading systems can facilitate a large number of market transactions. The greater the number of market transactions, the greater a market's liquidity. In liquid markets, prices are driven by competition, prices reflect a consensus of an investment's value, and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

Unfortunately, this improved speed and efficiency also increases the speed at which problems may occur and propagate, such as where the market ceases to operate as intended, i.e., the market no longer reflects a true consensus of the value of traded products among the market participants. Such problems are typically evidenced by extreme market activity such as large and/or rapid changes in price, whether up or down, over a short period of time, or an extreme volume of trades taking place.

In particular, traders, whether human or electronic, may not always react in a rational manner, such as when presented with imperfect information, when acting in fraudulent or otherwise unethical manner, and/or due to faulty training or design. For example, while communications technologies may have improved, inequities in access to information and opportunities to participate still exist, which may or may not be in compliance with legislative, regulatory and/or ethical rules, e.g., some traders receive information before other traders, or some traders may be able to process received information and/or place trader orders more quickly than others. In many cases, irrational trader behavior may be triggered by a market event, such as a change in price, creating a feedback loop where the initial irrational reaction may then cause further market events, such as a continued price drop, triggering further irrational behavior and an extreme change in the price of the traded product in a short period of time. High speed trading exacerbates the problem as there may be little time for traders, or those overseeing them, to contemplate their reactions and/or take corrective action before significant losses may be incurred. Furthermore, improved communications among traders facilitates propagation of irrational behavior in one market to other markets as traders in those other markets react to the results of the irrational behavior.

To mitigate risk and ensure a fair and balanced market, electronic trading systems need to provide mechanisms to rapidly detect and respond to situations where a market is not operating in a fair and balanced manner or otherwise where the market value is not reflective of a true consensus of the value of the traded products among the market participants.

The disclosed embodiments evaluate values associated with messages for certain markets or contracts, which may be implemented as, or represented by, objects, i.e. data objects, in the exchange computing system. For example, the values that are evaluated may be associated with newly received or incoming messages, or with messages previously received by the system, such as messages comprising requests for transactions related to an object. In one embodiment, an administrator associated with an exchange computing system may determine which messages and values associated therewith are subject to the evaluation and prevention logic disclosed herein.

When applied to electronic trading systems, the disclosed embodiments may continually scan for, rapidly detect and respond to extreme changes, either up ("spike") or down ("dip") in the market where a precipitous market move/change occurs. If an unacceptable message is detected, the disclosed embodiments may respond by taking an action, e.g., a corrective or responsive action, such as notifying the operator of the exchange, such as the Global Control Center ("GCC") of the Chicago Mercantile Exchange ("CME"), placing the market in a paused or reserved state, described in more detail below, establishing permanent or temporary trade price limitations, or other actions, or combinations thereof, to mitigate the effects of the extreme change, so as to, for example, slow down the market or otherwise allow traders time to adequately analyze and react to market conditions, and subsequently submitting more messages/orders that can be used to better determine a true consensus.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

In a futures market that has few resting orders but many stop orders, an order executed at a limit price can cause a cascading execution of buy or sell stop orders. The triggering and election of these stop orders can seem almost instantaneous lowering the value of a market in just a few seconds. A problem may occur when one or more trades bring many stop orders into the market. A fast execution of these stop orders may prevent opposite side orders from entering the market, preventing buyers from competing against other buyers and sellers from competing against other sellers. "Stop Price Logic" systems exist to handle extreme market changes due to an undesirable execution of stop orders. See, for example, U.S. Pat. Nos. 8,103,576 and 8,112,347 and U.S. Patent Publication No. 2005/0108141 A1, herein incorporated by reference in their entireties and relied upon. However, extreme market moves can occur that are not precipitated by conditional orders such as Stop Orders, thereby making such Stop Price Logic systems ineffectual.

Moreover, many customers may choose to apply conditional logic in their own systems which, based thereon, conditionally generates and submits non-conditional orders to the electronic trading system, instead of submitting conditional orders. As discussed above, a stop order may include or otherwise reflect a customer's trading strategy or preferences for when to trigger a trade (e.g., the limit price) based on market trading conditions (e.g., the stop price). Customers submitting both prices to the exchange as part of a stop order allows the exchange computing system to prevent undesirable changes in the order book or trade price of a product by reserving the market when the gap between a limit price and stop price is too large. If however, customers begin to reduce the usage of stop orders (for example, by submitting non-conditional limit orders when they observe certain conditions in the market), any exchange logic (such as Stop Price Logic) that focuses exclusively on stop orders may be ineffectual.

Some systems focus on the speed of the movement of the market, and detect when a market for a particular product moves too quickly, either up or down, in too short a period of time, e.g., the velocity of the market exceeds a defined threshold limit. See, for example, U.S. Pat. No. 8,660,936, entitled "Detection and mitigation of effects of high velocity price changes" ("the '936 patent"), the entire disclosure of which is incorporated by reference herein and relied upon. However, such "Velocity Logic" does not address all types of events in which a GCC or an administrator of an exchange would be interested.

Moreover, implementing both "Stop Price Logic" and "Velocity Logic" within the same code base may increase the amount of time that an incoming message has to be processed, thereby reducing the volume of, and/or slowing the rate at which, messages may be processed by the electronic trading system.

Accordingly, the disclosed embodiments may automatically detect and respond to unacceptable market values or conditions which may be the result of rapid automatic transaction processing of orders and messages submitted to a central book where all participants can submit orders at any time to the matching system.

When applied to an electronic trading system, the rapid state changes that may not reflect a true consensus may be problems limited to exchanges such as the CME that provide all customers access to a central order book that matches and trades orders per programmed rules.

A match engine module, such as one implemented by CME, may be centralized and coupled to multiple inputs from customers, and behave deterministically, e.g., programmed to depend on state, inputs and outputs. The rapid speed of automated trading systems implementing such a centralized, deterministic match engine, where all customers or traders can access a central limit order book for a product, can quickly result in a product state that does not reflect a true consensus or desirable state of the product. Accordingly the resulting problem is a problem arising in computer systems due to the high speeds of computer systems. The solutions disclosed herein are, in one embodiment, implemented as automatic responses and actions by an exchange computing system computer.

The market parameter(s), or derivations thereof, monitored for movement, the basis for determination of a qualifying magnitude of movement, and/or the duration of the requisite period of time over which a qualifying change may occur, may be configurable, as will be described, and implementation dependent, so as to allow the disclosed embodiments to balance performance versus the ability to accurately discriminate between extreme movements in the market which are reflective of valid market operation from those that are not.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

The disclosed embodiments recognize that electronic messages such as incoming messages from market participants, e.g., trade order messages, etc., are sent from market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby. For more detail on deterministic operation in a trading system, see U.S. patent application Ser. No. 14/074,667 entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

In one embodiment, if a participant wishes to modify a previously sent request, e.g., a prior order which has not yet been processed or traded, they may send a request message comprising a request to modify the prior request.

In one exemplary embodiment, the incoming request itself, e.g., the inbound order entry, may be referred to as an iLink message. iLink is a bidirectional communications/message protocol/message format implemented by the Chicago Mercantile Exchange Inc.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining", the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the above-referenced patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 1B:
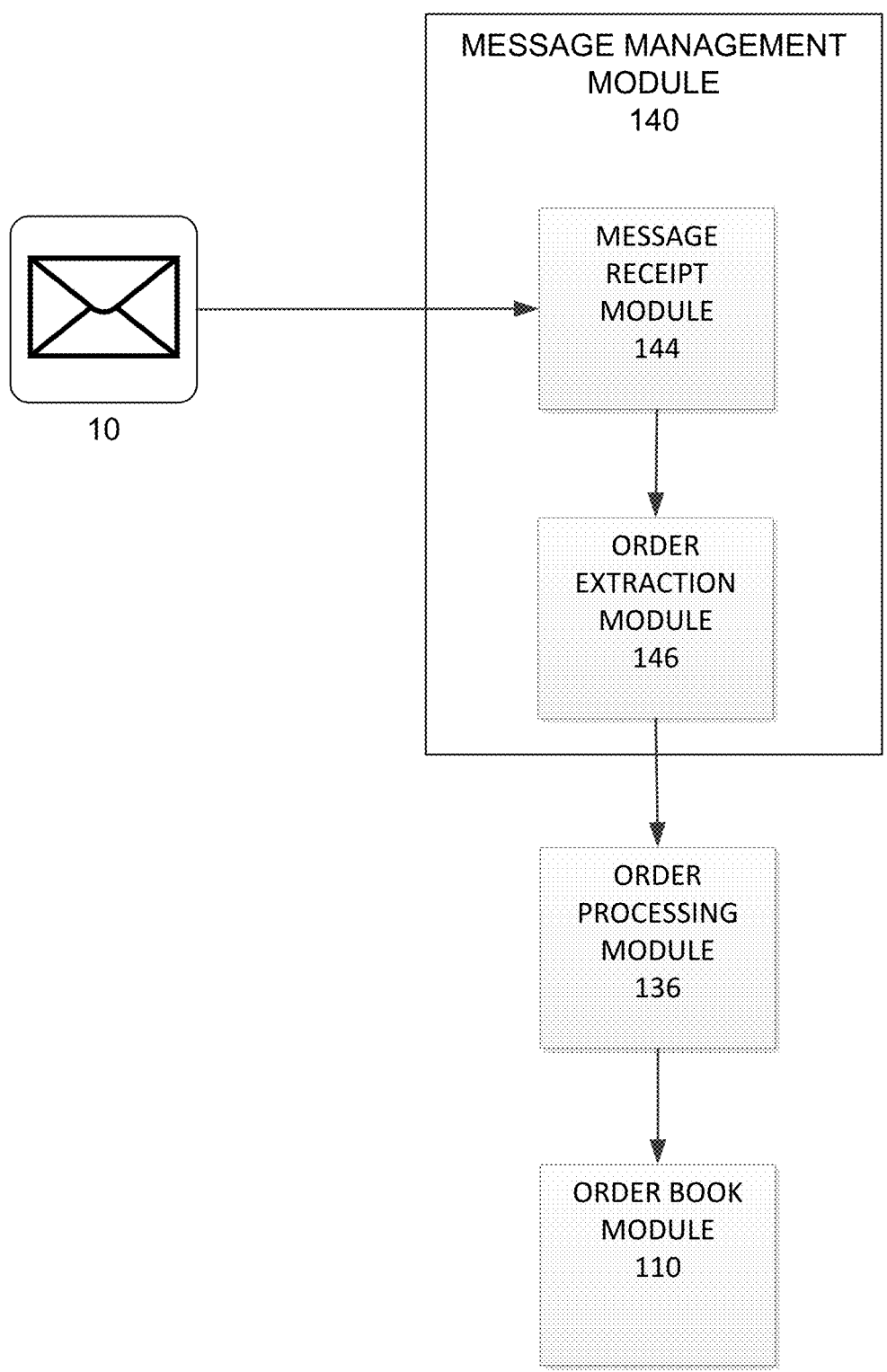
FIG. 1B depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 1B provides additional details for the message management module 140.

As will be described, the disclosed velocity detection and mitigation system may be implemented as part of the risk management module 134 and/or match engine module 106. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1A includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

As shown in FIG. 1A, the exchange computer system 100 further includes a message management module 140 which may implement, in conjunction with the market data module 112, the disclosed mechanisms for managing electronic messages containing financial data sent between an exchange and a plurality of market participants, or vice versa.

FIG. 1B illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

Figure 2:
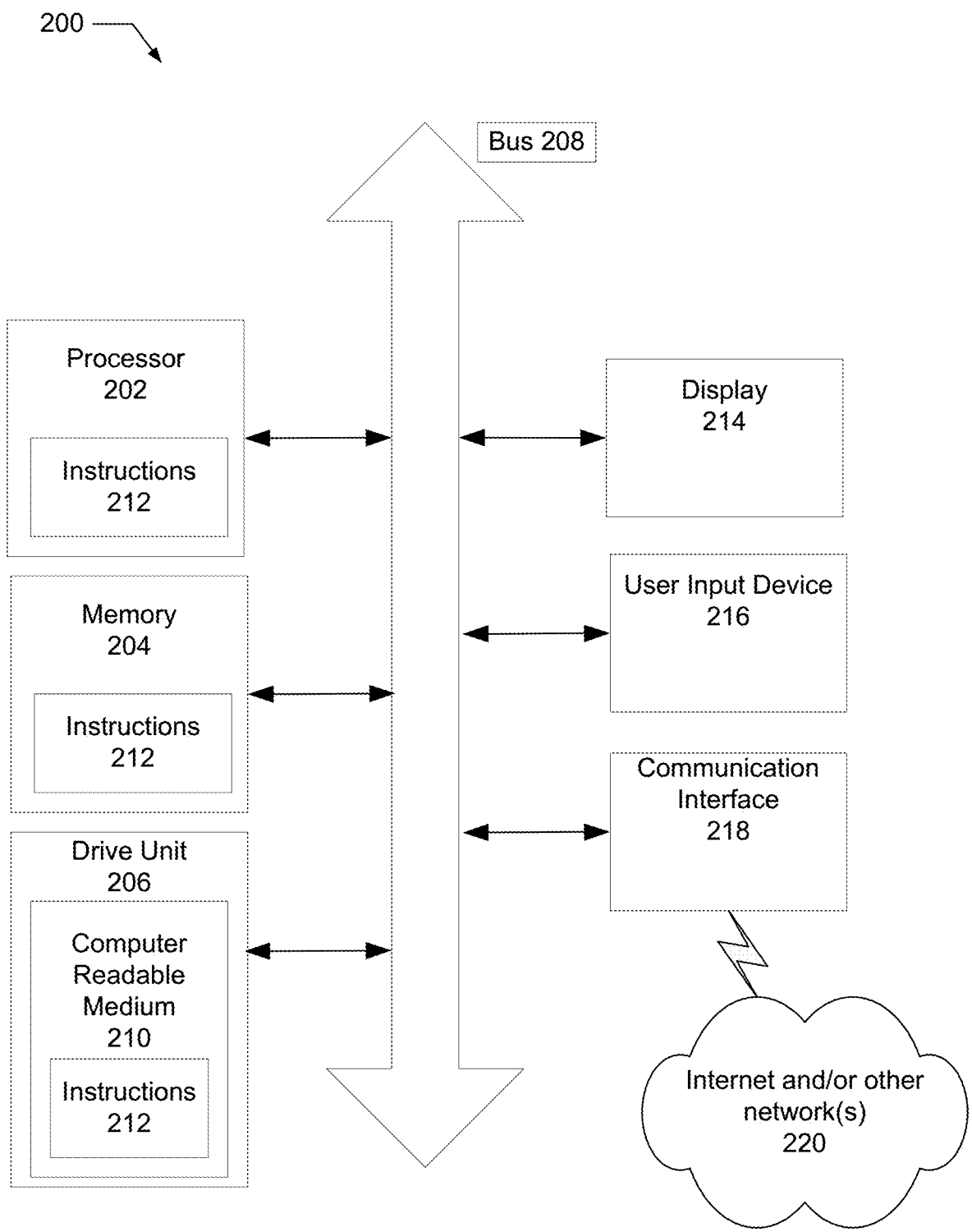
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be saved. The data may be stored in any device, or using any technique, operable to store and provide recovery of data. For example, a memory 204 or computer readable medium 210, may be used to store data, as is described above with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary embodiments, all transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Stop orders also rest on, or are maintained in, an order book to monitor for a trade at the stop price, which triggers an attempted trade at the limit price. In one embodiment, a triggered limit price for a stop order may be treated as an incoming order in some of the methods described herein.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:
  Price Explicit Time
  Order Level Pro Rata
  Order Level Priority Pro Rata
  Preference Price Explicit Time
  Preference Order Level Pro Rata
  Preference Order Level Priority Pro Rata
  Threshold Pro-Rata
  Priority Threshold Pro-Rata
  Preference Threshold Pro-Rata
  Priority Preference Threshold Pro-Rata
  Split Price-Time Pro-Rata For example, the Price Explicit Time trading policy is based on the basic Price Time trading policy with Explicit Orders having priority over Implied Orders at the same price level. The order of traded volume allocation at a single price level may therefore be:
  Explicit order with oldest timestamp first. Followed by
  Any remaining explicit orders in timestamp sequence (First In, First Out-FIFO) next. Followed by
  Implied order with oldest timestamp next. Followed by
  Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

$$(\text{Order volume}/\text{Matching volume}) * \text{Tradable volume}$$

The result is rounded down (for example, 21.99999999 becomes 21) unless the result is less than 1, when it becomes 1.
7. If tradable volume remains when the last order in the list had been allocated to, return to step 3.
Note: The matching list is not re-sorted, even though the volume has changed. The order which originally had the largest volume is still at the beginning of the list.
8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.

6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. Implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed embodiments may be implemented in a data transaction processing system that processes data items or objects. Customer or user devices (e.g., computers) may submit electronic data transaction request messages to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers.

The disclosed embodiments may be implemented to automatically perform a corrective action, e.g., halt or release the matching processor depending on the state of the system and/or the contents of the electronic data transaction request messages. For example, upon detecting an undesirable condition within the data transaction processing system, the disclosed velocity detection and mitigation system may cause halting of the matching processor, which prevents the matching processor from matching messages, e.g., places the system or data objects related to the undesirable condition in a reserved state. After the passage of time, receipt of a number of messages, or some other predetermined condition, the velocity detection and mitigation system may release the matching processor, or allow the matching processor to resume matching messages.

The disclosed embodiments effectively periodically sample, derive or otherwise measure a parameter indicative of the market value of a product, such as a futures contract, which may be represented as a data object within a data transaction processing system. The market for the product may also be referred to as an order book, which may be stored as a data structure within the memory of the data transaction processing system. Parameters indicative of the market value include the most recent price at which a trade was matched or quantity associated therewith, the most recently received, i.e. via an incoming order, bid price or quantity associated therewith, the most recently received, i.e. via an incoming order, ask price or quantity associated therewith, the current lowest ask price for an unmatched trade order resting in the order book or quantity associated therewith, the current highest bid price for an unmatched trade order resting in the order book or quantity associated therewith, combinations thereof or derivations therefrom, such as volatility, average, difference from historical values or other parameter, statistical or otherwise, indicative of the conditions under which the market is operating. When monitoring price based parameters, the values associated therewith may be measured in ticks, points or other metric. Time may be measured, as an overall elapse of time from an origin and/or between defined events, in second or milliseconds, or other increment. When sampling, deriving or otherwise measuring a parameter that is derived from an incoming trade order, such as the order price, every trade may be sampled or otherwise analyzed for comparison as will be described.

The disclosed embodiments may also monitor certain messages or orders for products traded via the exchange computing system. The disclosed embodiments may also monitor certain messages or orders for order books maintained on the exchange computing system. The products or order books may be represented as data objects within the exchange computing system. The monitored messages may be recently received messages (e.g., a limit price on a new incoming order, or a modification of a previous order), or recently triggered messages (e.g., a limit price in a stop order resting on the books that is triggered by a trade at the stop price).

The velocity detection and mitigation system may first determine whether or not an incoming message will actually trade, or cause a match, e.g., with a resting order. For example, a message management module 140, an order extraction module 146, and/or order processing module 136 of an exchange computing system may collectively extract and analyze a message and execute an instruction or action included therewith, including determining whether the message will cause or be involved in a match event. If it is determined that the message will cause or be involved in a match event, the velocity detection and mitigation system may also determine whether the message fully trades (e.g., whether all of the requested quantity of the order is satisfied/matches) or partially trades (e.g., whether only some of the quantity is satisfied/matches and the remaining quantity rests on the book to await a subsequent suitable counter order), and will also determine the trade prices (as opposed to the limit or submitted price) at which quantities will match or trade, e.g., match values. It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

In one embodiment, the velocity detection and mitigation system applies the prevention and risk management logic disclosed herein to limit values (whether they be incoming limit orders, modifications of previous limit orders, or triggered limit values from a conditional order) and/or trade values (the value at which a quantity is actually matched or executed) values associated with a message, depending on whether the message is fully matched, partially matched, or not matched at all, as described herein.

In one embodiment, if the velocity detection and mitigation system determines that all of the quantity of a checked message will match, the velocity detection and mitigation system ignores the limit value associated with the message and instead applies the prevention and risk management logic disclosed herein to the trade values associated with the message. It should be appreciated that not checking the limit value associated with the message reduces the processing required by the exchange computing system, increases the speed and throughput of the exchange computing system, and improves the overall performance of the exchange computing system.

In other words, when an order fully trades (i.e., all of the received quantity matches with resting quantities) at a trade (or match) value different (i.e., better) from the incoming or submitted value, the exchange computing system will not place the market in reserve even if the incoming or submitted value is an undesirable value, e.g., a price that violates pre-defined threshold standards, thus reducing overall system processing compared to a system that checks every incoming message value regardless of whether no quantity will actually trade at that checked incoming message value.

In one embodiment, if a submitted value violates pre-defined thresholds, but the actual trade or execution price does not violate pre-defined thresholds, the velocity detection and mitigation system does not place the market in reserve.

The values to be tested (whether they be the current sampled, derived or measured parameters or value at which different quantities will actually trade, depending on whether the order matches at all, and if so, whether it matches partially or fully) are compared with one or more sampled, derived, measured or computed values, or ranges thereof, representative of each interval or slice of time preceding the current sample, the collection of which may be referred to as a window as well as, in one embodiment, with some or all of the previous values sampled, derived or measured within the current interval.

FIGS. 3A and 3B illustrate various diagrams depicting how samples may be obtained and compared according to one embodiment. The disclosed embodiments sample or otherwise derive a market value parameter ($P_n$), which may be a high ($V_{hi}$) and/or low ($V_{lo}$) value thereof, during time intervals or slices $i_n$ that elapse upon a duration of time. For example, FIG. 3A illustrates time intervals $i_n$ associated with parameters $P_n$ which are representative of the value of a data object over the duration of the interval, e.g. the highest and/or lowest value over the interval.

During each interval or time slice, the sampled market parameter value, e.g., of each incoming trade or triggered limit value from a conditional order, is compared with one or more parameters indicative of the market value determined during each of a defined number of preceding intervals described above. In one embodiment, the sampled market parameter value, e.g., of each incoming trade or triggered limit value from a conditional order, is alternatively or additionally compared with one or more parameters sampled, derived or measured during the current interval.

It should be appreciated that sampled market parameter values of triggered limit values from conditional orders determined during a given interval refers to limit values that are triggered during the given interval.

In one embodiment, the sampled or derived parameter obtained during the current interval may be compared with comparative parameters/values, such as the values of the previously acquired samples of the preceding intervals, as well as the preceding values acquired during the current interval. In an alternative embodiment, at each interval other comparative parameters are determined, such as the highest and lowest value of the monitored parameter over the duration of particular interval, to which the sampled parameter obtained during the current interval is compared.

For the current interval, such highest and lowest values are determined as each market parameter is sampled, measured or derived, for comparison with the most current (e.g., incoming during the current interval or limit value from a conditional order triggered during the current interval) market parameter value.

Initially, when a trading period commences or otherwise there is no market history, e.g. the market opens, or otherwise when operation of the disclosed embodiments is initiated (or after a sufficient period of market inactivity as will be discussed below), the first sample of the market value parameter ($P_1$) may be defined, such as statically, or otherwise derived, such as based on the parameter value at the close of the prior trading period, the first value sampled, derived or measured upon commencement of the trading period, or based on some other method such as derivation of an indicative opening price.

The number of preceding intervals/slices which are subject to comparison is configurable and effectively defines a rolling window of time where older intervals are discarded as time moves forward, e.g. new intervals commence. In one implementation, this rolling time window may be structured or otherwise conceptualized as multiple overlapping sampling/monitoring windows or threads, referred to as overlapping time buckets ($b_n$) illustrated in FIG. 3B, which run for a defined period of time and where a new time bucket is commenced, the market value parameter is sampled or otherwise determined or derived, upon each elapse of the interval time i, and time buckets commenced at a time older than the defined number of preceding intervals are discarded. The number of active time buckets, the duration thereof, and the interval at which buckets are started then defines the window of time over which, or otherwise how far back, the disclosed embodiments operate. In one embodiment, if there has been no market activity during any of the intervals within the time window, the disclosed system considers the next market event to be akin to the start of a new trading period as described above.

It will be appreciated that whether the disclosed embodiments are conceptualized as overlapping time buckets or as a duration of time defined by intervals or slices, as described, or in any other manner, may be implementation dependent and all such conceptualizations, now or later developed, are contemplated herein.

In one embodiment, the time window over which an incoming order is compared may be defined order by order, e.g. based on the incoming order. That is, each incoming order has its own time window wherein the incoming order is compared with values within its associated time window.

For example, each incoming order may be compared with orders received in the window and preceding the current order. As described elsewhere, the window may be specified as an amount of time or a number of intervals.

Each sampled, derived or measured value obtained during the current time interval or slice is compared with one or more comparative values determined for preceding time intervals/slices, referred to as the time window, as well as, in one embodiment, each preceding sampled, derived or measured value, or the highest and or lowest thereof, during the current interval.

If the sampled value deviates, i.e. is above or below, from any of the comparative values by a threshold amount, which may be configurable and may be zero, the disclosed embodiments may indicate a qualifying event and indicate that action should be taken. In one implementation, the threshold amount is not less than one. The threshold amount may be statically or dynamically configured and reflects the magnitude of market movement between compared values that may be tolerated, i.e. the threshold amount delineates magnitude of movement/change, up or down, considered to be normal for the market and avoids, for example, placing a market in a reserved state that is not, in fact, under duress.

The threshold amount may be based on the product being traded or associated order book and may be, for example, a number determined by the GCC. For example, the threshold amount may be a multiple of a non-reviewable range ("NRR") that is pre-determined by, e.g., an administrator of the exchange computing system. A NRR may define a range that is considered a reasonable trading deviation from a product's fair or active (e.g., currently observed) value. In one embodiment, the NRR may be a range that an administrator or administrators of the exchange computing system consider to be a reasonable amount for a product to trade away from the product's fair value. In one embodiment, the NRR may be reviewed and established on a periodic basis, e.g., quarterly. The exchange administrators may consider a variety of metrics, such as volatility, average daily ranges, margin, and tick value, for example, to determine the NRR.

Figure 4:
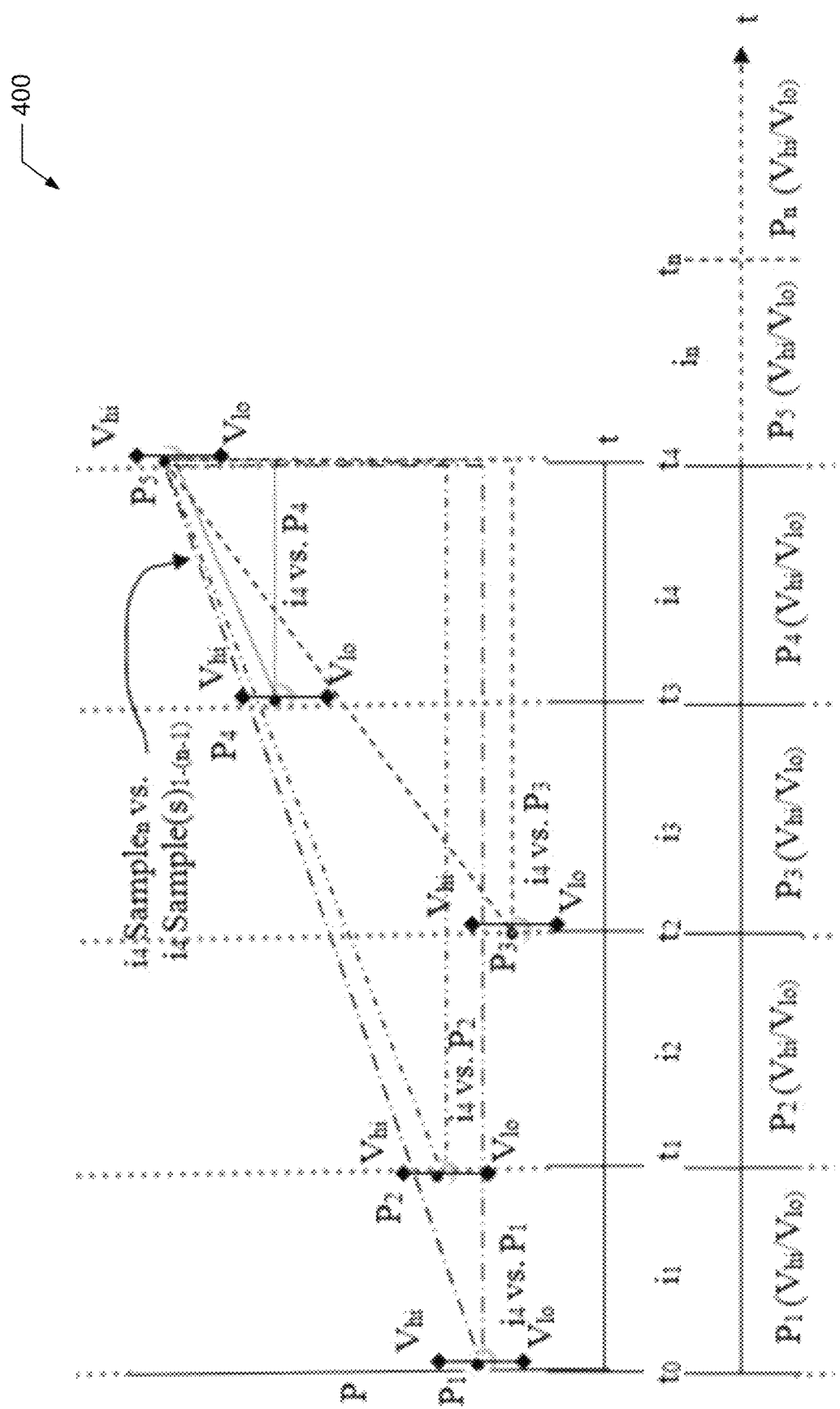
FIG. 4 depicts an illustrative graph of an example of the disclosed embodiments.

FIG. 4 illustrates an example comparison plot 400 of parameters that are sampled according to one embodiment of velocity detection and mitigation system. In FIG. 4, sampled parameters obtained during the interval $i_4$, namely, $P_5$, are compared with each of the preceding values sampled in interval $i_4$ as well as the values $P_4$, $P_3$, $P_2$ and $P_1$, or the high ($V_{hi}$) or low ($V_{lo}$) values thereof, of the preceding intervals. Plot 400 may effectively be used to measure the steepness and direction of the slope between the market value at the current interval and each of the preceding intervals where a qualifying event may be determined when the steepness of the slope, or angle or other value representative thereof, whether positive or negative, exceeds, or otherwise deviates from, a defined threshold value indicative, for example, of an extreme market movement. The slope may be positive as illustrated in FIG. 4, negative or neutral, between intervals.

In one embodiment, rapid oscillation or thrashing of the market value within the threshold values may also be detected and may also signify that the market is not operating properly, triggering the remedies described herein.

In one embodiment, the interval width, referred to below also as the duration of time or time slice length, may be dynamic and may vary interval to interval such as based on market activity, e.g. volume or volatility. For example, an interval may be defined as every 10 milliseconds, or after 10 orders have been received. As the comparative values computed at each interval are representative of the activity during that interval, the amount of activity aggregated together in one interval may thereby be normalized. In the case of dynamic interval widths, the time window over which values are compared, as described herein, may be specified in terms of an amount of time, rather than a number of intervals, so that the window may be a constant size even though the interval size may vary.

Figure 5:
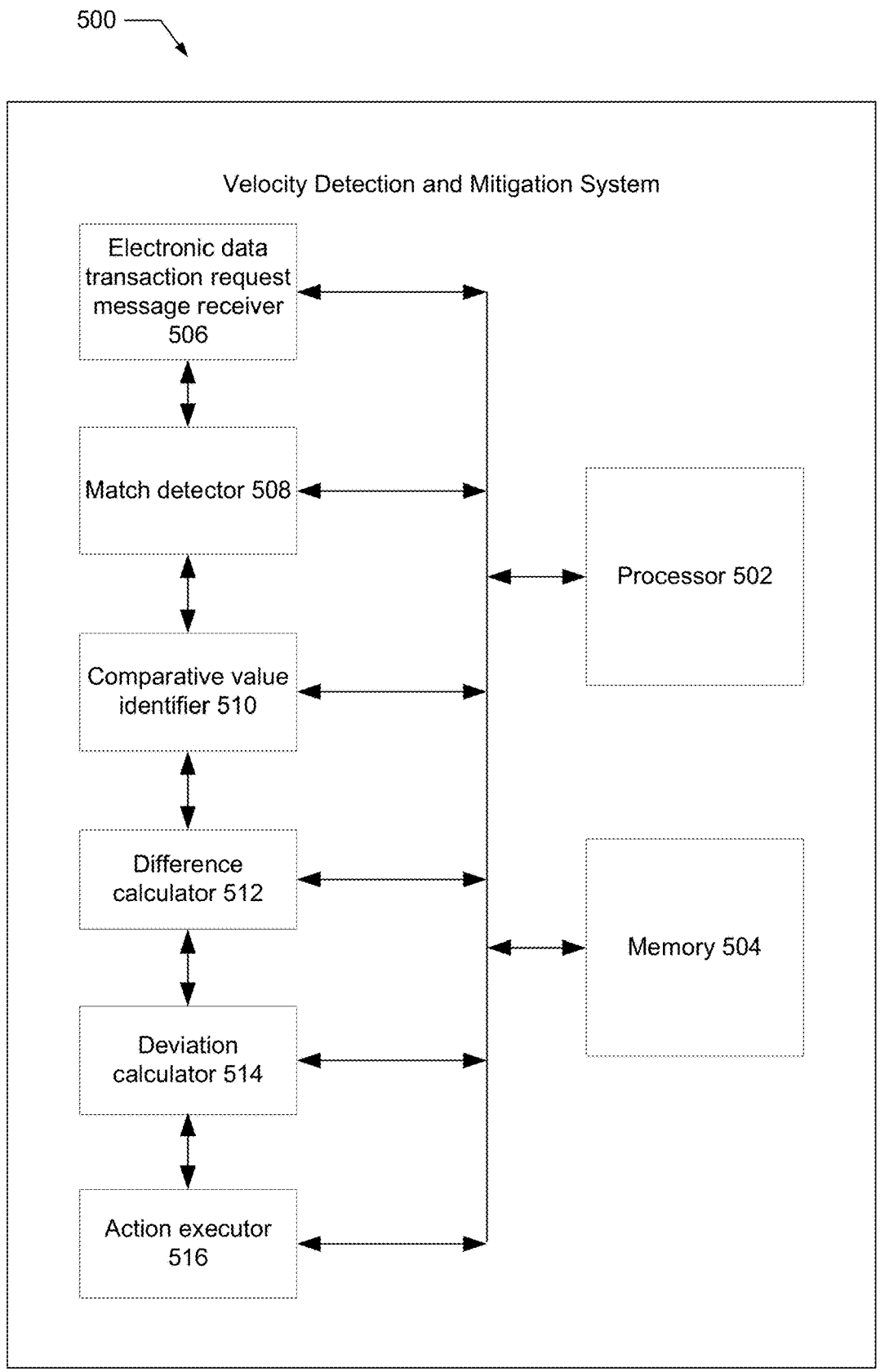
FIG. 5 depicts a block diagram of an exemplary implementation of a velocity detection and mitigation system in accordance with the disclosed embodiments.

FIG. 5 depicts a block diagram of a system 500, which may be referred to as "Velocity Logic," for mitigating effects of change in a market for a product, such as a financial instrument, which in an exemplary implementation, is implemented as part of the risk management module 134 and/or Match Engine Module 106 of the exchange computer system 100 described above. The financial instrument may be financial derivative products including futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts.

FIG. 5 shows a system 500 for mitigating an effect of a change in a market, such as a precipitous or otherwise extreme price change or other market move, either up or down, in short amount of time, for a data object transacted upon in a data transaction processing system, such as for example a product traded on an exchange, such as a financial instrument, e.g. futures contracts, options contracts, etc. The system 500 includes a processor 502 and a memory 504 coupled therewith which may be implemented as a processor 202 and memory 204 as described with respect to FIG. 2.

The system 500 further includes an electronic data transaction request message receiver 506 stored in the memory 504 and executable by the processor 502 to cause the processor 502 to receive and/or analyze electronic data transaction request messages submitted, for example, by users of an exchange computing system implementing a velocity detection and mitigation system. In one embodiment, receiving messages for an object may include identifying, e.g., sampling, the messages to determine a comparison value of the product, e.g. a value during each elapse of a duration of time which will be compared with prior values as described herein, such as bid or ask price of an incoming order ("aggressor") or a trade price thereof if matched to a resting order.

In one embodiment, the system 500 is coupled with the order books module 110 described above and monitors the relevant parameters of the order book maintained for the product. It will be appreciated that the system 500 may be coupled to other modules of the exchange computer system 100 so as to have access to the relevant parameters as described herein and initiate the requisite actions as further described. The disclosed embodiments may be implemented separately for each market/order book to be monitored, such as a separate process or thread, or may be implemented as a single system for all markets/order books to be monitored thereby.

The system 500 further includes a match detector 508 stored in the memory 504 and executable by the processor 502 to cause the processor 502 to determine whether an electronic data transaction request message will cause or be involved in a match, and if so, whether some but not all (e.g., a partial match), or all (e.g., a full match) of the quantity associated with the electronic data transaction request message is matched. The match detector also assigns message values or match values as comparison values. In other words, the match detector determines how much, if any, quantity of an electronic data transaction request message will match and at what value. The match detector then assigns the message value and/or any match values as comparison values to be checked, depending on whether the match detector detects a match at all, and if so, how much quantity associated with the electronic data transaction request message will match.

The velocity detection and mitigation system includes a comparative value identifier 510 that identifies at least one comparative value of the product, which may be stored, such as in the memory 504, for example in association with the data representative of a time window, for later comparison with future identified comparison values upon each elapse of the duration of time, e.g. each interval $i_n$ as shown in FIG. 4, and determining each previously identified comparative value identified within a threshold time thereof. As described above, during each the elapse of the time, each comparison value may further be compared with comparative values comprising the preceding comparison values, or a derivation thereof, determined during the elapse of time. As described herein, the comparative value may be derived from the same or a different parameter from the comparison value and more than one comparative value may be determined, such as a minimum and maximum thereof. Upon initiation of monitoring, such as when the market opens or re-opens or trading otherwise commences or after a sufficient period of inactivity (such as within the threshold time), the initial comparison and comparative values may be initialized to configured values or otherwise defined according to rules such as being based on the state of the market at the close of the prior trading period, e.g. based on an indicative opening price.

In one embodiment, a comparative value may be updated or revised based on previous object values. When applied to an electronic trading system, a comparative value may be a pre-defined threshold that is updated upon each elapse of duration of time based on a product's values during one or more previous elapses of durations of time.

In one embodiment for use in markets for which outright orders (orders actually placed by a trader) as well as implied orders (orders generated by the Exchange based on outright orders placed in other markets, e.g. spread orders), may be received, only aggressor orders, i.e. outright orders, may be included in the derivation of the comparative values and further utilized as comparison values. In this embodiment, received implied orders may be ignored by the system 500.

In one embodiment, the value of the product comprises, for example, a bid price of the product, an ask price of the product, a last traded price of the product, a last traded quantity of the product, a volatility of the product, or other market attribute value, or combination thereof. It will be appreciated that the value of the product may be determined according to other metrics of product value.

In one embodiment, the electronic data transaction request message receiver 506 is further executable by the processor 502 to cause the processor 502 to determine the comparison value of the product as a value of each order to trade the product received during the elapse of the duration of time, e.g. the bid price, the ask price or trade price. In one embodiment, the comparative value is derived from the same parameter as the comparison value. It will be appreciated that fewer than all orders to trade may be compared, and that this sampling frequency may be configurable.

Alternatively, the comparative value identifier 510 may be further executable by the processor 502 to cause the processor 502 to determine the at least one comparative value of the product as a minimum value of the product over the duration of time, e.g. the interval $i_n$ which just elapsed, maximum value of the product over the duration of time, an average of the value of the product over the duration of time, or combinations thereof. In one embodiment, the comparative value(s) may be computed as a weighted average wherein more recent values are favored over older vales.

The threshold time, which in one implementation may be the Time Slice Count, defines how far back the system 500 will look, referred to above as a "window" or number of active slices or intervals, i.e. how many intervals will be compared, and may be specified in seconds, milliseconds and/or as a multiple of the duration of time, i.e. interval $i_n$, e.g. Time Slice Count. It will be appreciated that different threshold times, e.g. asymmetric time windows, may be specified for positive market changes and negative market changes, such as where the rate of negative movement, e.g. a dip, is determined to be more critical than the rate of positive market movement, e.g. a spike. It will be appreciated that the threshold time may be set so as not to be less than a minimum amount of time required for a market participant to react to a change in the market, e.g. receive and assimilate market data indicative of the change and submit an order responsive thereto. In other words, the threshold time should be set so as to allow the market participants a chance to respond and correct an extreme market change before the system 500 reacts thereto as described.

The system 500 further includes a difference calculator 512 stored in the memory 504 and executable by the processor 502 to cause the processor 502 to determine a difference between the identified comparison value, e.g. sample, and each of the determined previously identified comparative values. The current sample/comparison value is compared only with previously identified comparative values that are within the defined time window, i.e. within the threshold time of the current time.

The system 500 further includes a deviation calculator 514 stored in the memory 504 and executable by the processor 502 to cause the processor 502 to determine if any of the determined differences deviate, either higher or lower, from a threshold value. As described above the threshold value defines the magnitude of movement, either up (positive) or down (negative), which would be tolerated, e.g. considered normal market behavior. The threshold value may be specified in terms compatible with the values being monitored and compared, such as price ticks, points or other metric. For example, the threshold value may be 10 ticks. If the comparison value differs from an of the relevant prior comparative values but more than 10 ticks, either more than 10 ticks above or more than 10 ticks below, a deviation is determined. It will be appreciated that the threshold values may be asymmetric, i.e. a threshold value may be specified for positive market changes and a different threshold value may be specified for negative market changes, such as where market dips are considered more critical than market spikes. In one embodiment, the threshold value(s) may be dynamic and may vary over time, such as from interval to interval, such as based on market activity, e.g. volume or volatility.

It will be appreciated that the comparative values and/or the threshold values may be configured such that a comparison subsequent to the elapse of the duration of time may not cause a result different from than had the comparison been performed just prior to the elapse of the duration of time. For example, it may be desirable to configure the comparative and/or threshold values such that an incoming order received after the end of an interval would cause the same result as if that order had been received just prior to the end of that interval.

The system 500 further includes an action executor 516 stored in the memory 504 and executable by the processor 502 to cause the processor 502 to perform an action, when any of the determined differences deviate the threshold value. That is, if the market moved too far, up or down, too fast, e.g. the slope or gradient of the movement (or angular or other measure thereof) versus the time over which the movement is measured is too steep, positive or negative, it is determined that a qualifying event has occurred, referred to as a "Velocity Logic Event," and one or more actions may be take or caused to be taken.

In one embodiment, the action may include placement of the market for the product in a reserved state, as was described above, such as for a limited time period which may be configurable and may be a static or dynamic value and may vary among markets. In one embodiment, if during the reserved state additional conditions, such as based on whether the market is recovering to a normal operating state or not as the reserved state is nearing an end, are met, the time limit for staying in reserved state may be extended. Alternatively, or in addition thereto, the action may include transmission of an alert to an operator of the exchange, such as the GCC of the CME, a trader of the product, or a combination thereof. Alerts may be sent as market data. Where the market is placed in a reserved state, the alert may further advise the recipient of this state. A subsequent message may then be sent when the market is taken out of the reserved state or if the reserved state is extended. Alternatively, or in addition thereto, the action may include permanent or temporary enablement of trading opportunities for the product in a different market. For example, implied markets for which the current product may be a leg, etc. may be enabled to create additional matching opportunities, i.e. additional liquidity. Alternatively, or in addition thereto, the action may include permanent or temporary prevention of trading of the product at a price outside of a price limit, i.e. a ceiling or floor. If the detected extreme movement is downward, the limit may set as a limit below which trading is not allowed, e.g. a floor. Alternatively, if the detected extreme movement of the market is upward, the limit may be set as a limit above which trading is not allowed, e.g. a ceiling. In one embodiment, if orders to trade are subsequently received substantially close to, or at, or otherwise within a threshold of, the limit, the limit may be periodically raised (or lowered), such as after a defined delay period, to gradually allow a market, intent on reaching a particular price, to eventually reach the price in a controlled manner, e.g. the market is slowed down.

Alternatively, or in addition thereto, the action may include modifying the matching/allocation algorithm used to allocate incoming orders to resting orders. For example, if the current matching algorithm is First-In-First-Out ("FIFO"), also referred to as Price-Time, the algorithm may be changed to Pro-Rata. Other algorithms which may be used include Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, Split Price-Time Pro-Rata. See, for example, U.S. patent application Ser. No.

13/534,399 entitled "Multiple Trade Matching Algorithms" herein incorporated by reference in its entirety and relied upon.

In one embodiment, the system 500 may receive the duration of time, the threshold time and the threshold value, or other parameters which control the operation of the disclosed embodiments, such as from the operator of the exchange computer system, e.g. the GCC of CME. These configurable parameters include: which markets to be monitored if not all markets, such as where performance constraints limit deployment or where it may be determined that some markets are not susceptible to the problems described herein and therefore need not be monitored; the comparison value (which may be referred to below as the VL Price or Trade Price), such as which parameter of the market should be used during the operation of the system 500 and/or the initial value thereof, which may be specified as a dollar amount, tick value or other metric; the comparative values (which may be referred to below as the VL Ref Low and VL Ref High values), such as which parameter(s) of the market should be used during the operation of the system 500 and/or the initial value(s) thereof, which may be specified as a dollar amount, tick value or other metric; the duration of time or interval (which may be referred to below as the Time Slice Length) and may be specified as a number of seconds or milliseconds; the threshold time or window (which may be referred to below as the Time Slice Count or number of intervals or alternatively as the Time Slice Count*Time Slice Length) and may be specified as a number of intervals or a length of time, in seconds or milliseconds for example, and may be a multiple of the duration of time/interval/Time Slice Length; the threshold value (which may be referred to below as the VL Value); the action(s) to be taken; the time limit for keeping a market in a reserved state; or other parameters. It will be appreciated that any or all of these parameters may be statically defined for application to all markets, may vary from market to market and/or may be dynamically configured/re-configured during operation, either automatically responsive to market conditions or manually, e.g. by the operator of the exchange computer system 100.

Figure 6:
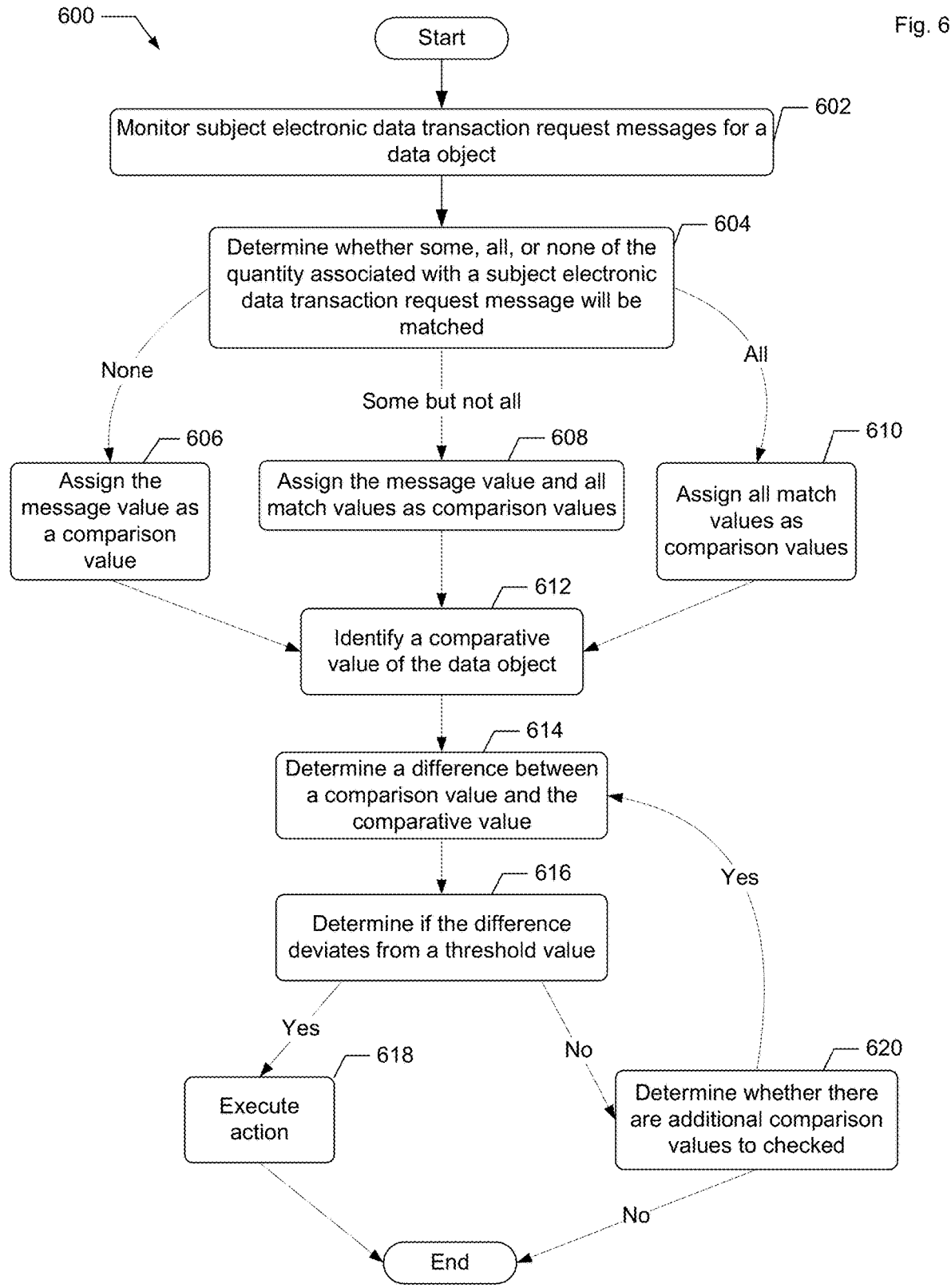
FIG. 6 depicts an example flowchart for implementing a velocity detection and mitigation system in accordance with the disclosed embodiments.

FIG. 6 illustrates an example flowchart 600 indicating a method of implementing the disclosed velocity detection and mitigation system, as may be implemented with computer devices and computer networks, such as those described with respect to FIGS. 1 and 2. Embodiments may involve all, more or fewer actions indicated by the blocks of FIG. 6. The actions may be performed in the order or sequence shown or in a different sequence. In one embodiment, the steps of FIG. 6 may be carried out by risk management module 134 and/or match engine module 106, or a velocity detection and mitigation system implemented via risk management module 134 and/or match engine module 106.

The operation includes: receiving and/or monitoring, by a processor 502, electronic data transaction request messages for a data object, as shown in block 602. As discussed herein, the message may be a new incoming message, or may be a conditional message that is triggered. In one embodiment, any message that is monitored may be referred to as a subject message. It should be appreciated that that the subject message will include a message value and a message quantity. For example, a message may include an instruction to purchase a specified number of units (i.e., message quantity) of a product associated with a data object at a specified value or price (i.e., message value).

The processor 502 may then determine whether some, all, or none of the quantity associated with a subject electronic data transaction request message will be matched, as shown in block 604. In one embodiment, a processor determines whether any quantity will match with an existing order based on the contents of the subject message and the orders currently resting or awaiting match in the computing environment.

If none of the quantity associated with a subject electronic data transaction request message will be matched, the processor assigns the message value as a comparison value, as shown in block 606. As described below, comparison values are to be compared with comparative values.

If some, but not all, of the quantity associated with a subject electronic data transaction request message will be matched, the processor assigns the message value and all match values as comparison values, as shown in block 608.

It should also be appreciated that a subject message may match with existing orders at the message value or a value better than the message value. For example, an order to purchase 15 units at a value of 20 may actually match with resting orders at a value of 17. Similarly, an order to sell 15 units at a value of 20 may actually match with resting orders at a value of 25. Thus, a submitter of a subject message may receive a better price (which may be higher or lower than the submitted or message value, depending on whether the submitter's instruction was to buy or sell a quantity at a value) than he or she actually submitted.

In some instances, a subject message may match with more than one "better" price that is resting on the books. For example, an order to sell 15 units at a value of 20 may actually match with more than one resting orders at different better value. For example, 6 of the 15 units may match at a value of 14, and 5 of the 15 units may match at a value of 18. The remaining 4 units of the 15 units may match at some other value up to 20, or not match and be added to the order books at a value of 20, and wait to be matched at a value of 20.

In one embodiment, match values may refer to the values at which quantities will actually match. It should be appreciated that if a quantity matches at the value included in the message, the match value is the same as the message value.

If all of the quantity associated with a subject electronic data transaction request message will be matched, the processor assigns all match values as comparison values, as shown in block 610.

In one embodiment, the parameters that are sampled are a submitted value (e.g., a price included in an incoming message, or a triggered limit price from a stop order). The system may determine a trade value for each message, which may be the same or different than a submitted value. For example, a new incoming message may include an instruction to purchase 5 units of a product at a value of 7. Or, a conditional message may be triggered which includes an instruction to purchase 5 units of a product at a value of 7. In both cases (whether a new incoming message or a triggered conditional message), the submitted value may be considered to be 7. However, the system may determine that the 5 units (i.e., the submitted quantity) may all match with a resting order at a value of 4. Thus, the system concludes that the trade value (i.e., the match or execution value) is 4. It should be appreciated that the trade value may be the same as or "better than" (lower if buy order, higher if sell order) the submitted value.

The system may check the submitted value, trade value, or both, depending on whether the message will fully trade (e.g., all of the quantity associated with a message matches an order resting on the books), partially trade (e.g., only some, but not all, of the quantity associated with a message matches an order resting on the books), or not trade (e.g., none of the quantity associated with a message matches an order resting on the books, and accordingly all of the quantity associated with the message is added as an order resting on the books).

In one embodiment, if the system checks the trade or match value, the system checks the match value against both a high threshold (e.g., a ceiling value) and a low threshold (e.g., a floor value). If the system checks the message value, the system checks the message value against a high threshold if the transaction is a buy, and the system checks the message value against a low threshold if the transaction is a sell.

Once the processor determines whether a subject match will occur and if so, how much quantity will match at various match values, the process may include identifying, by the processor 502, a comparative value of the data object, as shown in block 612. The comparative value may be the value against with the comparison values, determined in connection with blocks 606, 608 and 610, are compared or tested. The comparative value may be based on previous matches, for example, for the data object.

The process then determines a difference between any values assigned as comparison values and the comparative value, as shown in blocks 614 and 620. The process also determines if the difference deviates from a threshold value.

In one embodiment, multiple comparison values are stored in the memory. For example, 50% of the quantity associated with a message may match at a first match value, and the other 50% of the quantity associated with the message may match at a second match value. Or, 50% of the quantity associated with a message may match at a first match value, 30% of the quantity associated with the message may match at a second match value, and 20% of the quantity associated with the message may not match at all. Thus, it should be appreciated that processing an order or message according to process 600 may result in multiple comparison values comprising one message value and multiple match values. In other words, if process 600 results in multiple comparison values, blocks 614 and 616 are applied first to the "best" match value, i.e., the match value furthest from the message value, then to the second-"best" match value, and so on until the last or worst comparison value (which may be the message value, or the worst match value) is processed.

For example, a new incoming message may include an instruction to purchase 5 units of a product at a value of 7. Or, a conditional message may be triggered which includes an instruction to purchase 5 units of a product at a value of 7. In both cases (whether a new incoming message or a triggered conditional message), the submitted value may be considered to be 7. Depending on the state of the resting order book or computing environment, the system may determine that 1 unit may match with a resting order at a value of 4, 3 units may match with a resting order at a value of 6, and 1 unit does not match at all. Thus, a system implementing process 600 assigns values of 4 (the best match value, which is lower than the message value, and is considered best because the instruction was a purchase instruction and 4 is the lowest price available for a purchase transaction), 6 (the second best match value), and 7 (the message value) as the comparison values. The system compares each comparison value to the comparative value, but begins with the best comparison value of 4. If only value 4 meets the threshold criteria based on the comparative value (i.e., value 6 causes the system to place the market in a reserved state), the system will allow the 1 unit associated with value 4 to match before turning to a comparison with 6 (which again will cause the system to place the market in a reserved state).

The process may include performing, by the processor 502, a responsive action, when the determined difference deviates from the threshold value, as shown in block 618. As alluded to above, the process also checks whether there are any more comparison values to compare, as shown in block 620, and repeats steps or blocks 614, 616, 618 and 620 until all comparison values have been checked.

In one embodiment, the value of the product may include a bid price of the product, an ask price of the product, a last traded price of the product, a last traded quantity of the product, a volatility of the product, or other market attribute value or combination thereof.

In one embodiment, the identifying further includes determining the comparison value of the product as a value of each order to trade the product received during the elapse of the duration of time. It will be appreciated that fewer than all orders to trade may be compared, and that this sampling frequency may be configurable.

In one embodiment, the identifying further includes determining the at least one comparative value of the product as a minimum value of the product over the duration of time, maximum value of the product over the duration of time, an average of the value of the product over the duration of time, or combinations thereof.

In one embodiment, the threshold time may be specified as a multiple of the duration of time, e.g. time slice length multiplied by time slice count.

In one embodiment, the identifying further includes storing the identified comparative value(s) in a memory.

In one embodiment, the action may include placing the market for the product in a reserved state, sending an alert to an operator of the exchange, a trader of the product, or a combination thereof, enabling trading opportunities for the product in a different market, preventing trading of the product at a price outside of a price limit, or combinations thereof.

The operation of the system 500 may further include receiving, by the processor, the duration of time, the threshold time and the threshold value, or other configurable parameters, prior to initiating operation of the system 500 or during the operation thereof.

In one embodiment, the system 500 is applicable to a Group or an IXM, so that maximum flexibility in adapting the system 500 to a Market's specific needs is provided. It will be appreciate that some markets are heavily dependent on lead-month trading activity (e.g. Crude Oil), while others have activity across the entire curve (e.g. Euro-Dollar). The operator of the exchange computer system 100 should be able to configure the system 500 such that lead-months are handled differently than the rest of a group.

An example of the operation of the system 500 is provided below. In the examples which follow, the following definitions may be used:

Aggressing/Aggressor order—an order that the engine can attempt to match against the book;

Velocity Logic ("VL") Event—a condition detected by the system 500 wherein an incoming Velocity Logic eligible Market Event violates the Floor or Ceiling of a particular Time Slice/interval;

VL Value (threshold value)—the GCC configured Value that is added or subtracted to determine the VL Ref High or VL Ref Low (defined below). This value may be specified as a number of points only, as opposed to ticks. This value may acts as a +/− width;

Time Slice—a configurable period of time over which market attributes are tracked and compared, also referred to as an interval.

Time Slice Count—the GCC configured number of Time Slices or intervals the system 500 should use to detect VL events;

Time Slice Length (duration of time)—the GCC configured length of time each Time Slice/interval. May be specified as a number of milliseconds or other time increment;

VL Detection Duration=Derived as Time Slice Count*Time Slice Length. In one embodiment this value is derived from the Time Slice Count and Time Slice Length values. However it will be appreciated that this value may instead be specified along with one of the Time Slice Count or Time Slice Length with the unspecified value being derived.

VL Prices—in the examples which follow, in the Open or non-reserved state, the system 500 may use these prices to detect Velocity Logic events:
  Better Bids/Offers;
  Trades;
  Implied Better Bids/Offers;
  Curve Banding (if on);
    When using the CurveBanding price, if GCC has configured an Offset, the Engine will apply the offset to the CurveBanding price and then utilize this price for Velocity Logic; or
    Actionable, tradeable or otherwise executable price.

VL Ref High (Comparative Value)—the highest VL Price in a given Time Slice

VL Ref Low (Comparative Value)—the lowest VL Price in a given Time Slice

Floor—derived as VL Ref High−VL Value

Ceiling—derived as VL Ref Low+VL Value

VL Range=the range that VL detectable market activity can be within, derived as the Ceiling—Floor.

In one embodiment, the system 500 may be described using Overlapping Time Slices as follows:
  Velocity Logic Order of Operations:
  1. Bands are checked first
  2. Velocity is checked after bands
  Velocity Logic Operates as Follows:
  1. a. Save the Hi & Lo VL Reference Value of the last Time Slice
    b. Cleanup old VL Ref Vals
    c. Compare VL Reference Values:
      i. How to compare:
        1. Trade Price is less than Lo VL Reference Value+VL Value
        2. Trade Price is greater than Hi VL Reference Value−VL Value
      ii. What to Compare:
        1. Current Time Slice
        2. Prior Time Slice
      iii. Result
        1. All comparisons against Current and Prior Time Slices must be True
        2. If one comparison is false, VL Event detected.
    d. Accumulate/Track VL Ref Vals of the Current Time Slice In exemplary operation wherein a GCC User wishes to detect rapid price moves within a specified time, so that the system 500 can identify Velocity Logic events accurately and efficiently, the system 500 may operate as follows (Refer to FIG. 7 for a graph of the values described below):

Configurations:
VL Value=10
Time Slice Count=2
Time Slice Length=500 ms
VL Detection Duration=1000 ms
Step-by-Step:
1. Opening trade at 100 in TS:A (Time Slice A)
   a. VL Reference Value of Current TS: Hi=100, Lo=100
2. Trade at 102 in TS:A
   a. Save VL RefVal of Last Time Slice—n/a
   b. Cleanup old VL RefVals—n/a
   c. Compare
     i. Current Time Slice=(100−10) to (100+10), range is 90 to 110, trade of 102 passes
     ii. Prior Time Slices=n/a
   d. Accumulate/Track VL RefVal of Current Time Slice: Hi=102, Lo=100
3. Trade at 105 in TS:A
   a. Save VL RefVal of Last Time Slice—na
   b. Cleanup old VL RefVals—n/a
   c. Compare
     i. Current Time Slice=(102−10) to (100+10), range is 92 to 110, trade of 105 passes
     ii. Prior Time Slices=n/a
   d. Accumulate/Track VL RefVal of Current Time Slice: Hi=105, Lo=100
4. Trade at 101 in TS:B
   a. Save VL RefVal of Last Time Slice—TS:A Hi=105, Lo=100
   b. Cleanup old VL RefVals—n/a
   c. Compare
     i. Current Time Slice=n/a
     ii. Prior Time Slices=(105−10) to (100+10), range is 95 to 110, trade of 101 passes
   d. Accumulate/Track VL RefVal of Current Time Slice: Hi=101, Lo=101
5. Trade at 110 in TS:B
   a. Save VL RefVal of Last Time Slice—n/a
   b. Cleanup old VL RefVals—n/a
   c. Compare
     i. Current Time Slice=(101-10) to (101+10), range is 91 to 111, trade of 110 passes
     ii. Prior Time Slices=(105-10) to (100+10), range is 95 to 110, trade of 110 passes
   d. Accumulate/Track VL RefVal of Current Time Slice: Hi=110, Lo=101
6. Trade at 108 in TS:C
   a. Save VL RefVal of Last Time Slice=TS:B Hi=110, Lo=101
   b. Cleanup old VL RefVals—n/a
   c. Compare
     i. Current Time Slice=n/a
     ii. Prior Time Slices
       1. TS:B=(110−10) to (101+10), range is 100 to 111, trade of 108 passes
       2. TS:A=(105−10) to (100+10), range is 95 to 110, trade of 108 passes
   d. Accumulate/Track VL RefVal of Current Time Slice: Hi=108, Lo=108
7. Trade at 111 in TS: D
   a. Save VL RefVal of Last Time of Current Time Slice: Hi=108, Lo=108
   b. Cleanup old VL RefVals—clear TS:A values out
   c. Compare
     i. Current Time Slice=n/a
     ii. Prior Time Slices 1. TS:C=(108−10) to (108+10), range is 98 to 118, trade of 111 passes
    2. TS:B=(110−10) to (101+10), range is 100 to 111, trade of 111 passes
  d. Accumulate/Track VL RefVal of Current Time Slice: Hi=111, Lo=111
8. Trade at 82 in TS:G
  a. Save VL RefVal of Last Time Slice—TS: D Hi=111, Lo=111
  b. Cleanup old VL RefVals—clear all values from TS: D and prior
  c. Compare
    i. Current Time Slice=n/a
    ii. Prior Time Slices=n/a, trade of 82 passes
  d. Accumulate/Track VL RefVal of Current Time Slice: Hi=82, Lo=82
9. Trade at 93 in TS:H
  a. Save VL RefVal of Last Time Slice—TS:G Hi=82, Lo=82
  b. Cleanup old VL RefVals—n/a
  c. Compare
    i. Current Time Slice=n/a
    ii. Prior Time Slices=(82−10) to (82+10), range is 72 to 92, trade of 93 fails and is not allowed, VL Event occurs Additional examples of operation of the system 500
Given—
Price Banding is off
a VL Value of 10
a Time Slice Length of 10000 ms (10 seconds) a Time Slice Count of 0
a Trade of 100
When—
a Trade of 89 occurs (within the same Time Slice as the Trade of 100)
Then—
The system 500 should detect a VL event, which results in a Monitor Message stating "Warning: CLH3 Velocity Logic Event detected. Trade Price [89], VL Ref Price [100]."

Example 2: wherein the system 500 compares current trades against the current time slice's only trade, so that VL events are detected
Given—
Price Banding is off
a VL Value of 10
a Time Slice Length of 10000 ms (10 seconds) a Time Slice Count of 0
a Trade of 100
When—
a Trade of 111 occurs (within the same Time Slice as the Trade of 100)
Then—
The system 500 should detect a VL event, which results in a Monitor Message stating "Warning: CLH3 Velocity Logic Event detected. Trade Price [111], VL Ref Price [100]."

Example 3: Wherein only VL Prices in the current Time Slice to trip VL, so that old VL Prices do not cause a VL event:
Given—
Price Banding is off
a VL Value of 10
a Time Slice Length of 10000 ms (10 Seconds) a Time Slice Count of 0
a Trade of 100
wait 11 seconds
When—
a Trade of 89 occurs
Then—
the trade should be allowed and no FAS Monitor Message is displayed Example 4
Given—
Price Banding is off
a VL Value of 10
a Time Slice Length of 10000 ms (10 Seconds) a Time Slice Count of 0
a Trade of 100
wait 11 seconds
When—
a Trade of 111 occurs
Then—
the trade should be allowed and no Monitor Message is displayed In one embodiment, the system 500 may not utilize settlement prices as the comparison/comparative values. In one embodiment, the system 500 may compare current trades against the current Time Slice's Best Bid or Best Offer, so that VL events are detected. In one embodiment, the VL Value may be added/subtracted in full when calculating the VL Range, so that the VL Value acts as a width. In one embodiment, the system 500 may compare prices to VL Reference Values inclusive of the VL Range, so that Prices that occur that are equal to the VL Range do not trigger a VL event. In one embodiment, the system 500 may be enabled or disabled by the operator of the electronic trading system 100 as to all markets or particular markets.

In one embodiment, the system 500 uses a VL Reference Value at the beginning of a Time Slice, so that Velocity Logic can be consistent with current market conditions. This may be tested as follows:
  Test 1:
  VL Value=10, TSC=2, TSL=500 ms
  Trade 1@100
  Trade 1@91
  Wait 500 ms
  Trade 1@112, VL Event triggered, VL Range violated should be 90→111

In one embodiment, the VL Reference Values may be cleaned up over time, so that they are not part of Velocity Logic beyond the configured number of Time Slices. This may be tested as follows:
  Test 1:
  VL Value=10, TSC=2, TSL=500 ms
  Trade 1@100
  Trade 1@91
  Wait 1500 ms
  Trade 1@112, trade is allowed In one embodiment, the system 500 compares Prices to VL Reference Values within the Current Time Slice and the Prior # of Configured Time Slices, so that there are no gaps in VL detection. This may be tested as follows:
  Test 1:
  VL Value=10, TSC=2, TSL=500 ms
  Trade 1@100
  Trade 1@91
  Wait 500 ms
  Trade 1@95, within VL Range of TS:1 90→111, trade passes. Hi/Lo of CTS is 95/95
  Trade 1@112, VL Event triggered since VL Range of CTS violated (85→105)

In one embodiment, the system 500 accumulates prices toward the future, so that prices that occur on the time slice boundary count for the Current Time Slice. This may be tested as follows:
Test 1:
VL Value=10, TSC=2, TSL=500 ms
IOP Trade 1@100, Hi/Lo of CTS is 100/100
Trade 1@112, VL Event triggered since VL Range of CTS is 90→110

In one embodiment, the VL Value may be added/subtracted in full when calculating the VL Range, so that the VL Value acts as a width. This may be tested as follows:
Test 1:
VL Value=10, IXM Tick=0.3333
Hi/Lo of CTS is 100/100
Trade 1@112, VL Event triggered since VL Range of CTS is 90→110

In one embodiment, the system 500 compares Prices to VL Reference Values inclusive of the VL Range, so that the Prices that occur that are equal to the VL Range do not trigger a VL event. This may be tested as follows:
Test 1:
VL Value=10, TSC=2, TSL=500 ms
Trade 1@100, Hi/Lo of CTS is 100/100, VL Range is 90→110
Trade 1@91, Hi/Lo of CTS is 100/91, VL Range is 90→111
Trade 1@111, trade passes In one embodiment, the system 500 uses Time Slice Length to determine the duration of each Time Slice. This may be tested as follows:
Test 1:
VL Value=10, TSC=2, TSL=500 ms
Trade 1@100
Trade 1@91, Hi/Lo of CTS is 100/91, VL Range is 90→111
Wait 1000 ms
Trade 1@111, Hi/Lo of CTS is 111/111, VL Range is 91→121
Trade 1 @112, VL Event triggered because 112 violates VL Range of first Time Slice, 90→111

In one embodiment, the system 500 uses Time Slice Count to determine how VL RefVals are cleaned up over time. In one embodiment, the system 500 derives a VL Detection Duration from the configuration, so that the length of time that the market will be safeguarded may be known. In one embodiment, the
VL Reference Value may be specified in points only, rather than ticks, so that exchange operator, e.g. GCC, can configure markets consistently. In one embodiment, the system 500 uses a minimum Time Slice Count of 0, so that the Engine can track the market accurately during a specified time. In one embodiment, the VL Reference Values may age only over time, so that they remain in effect through changes in state. In one embodiment, the system 500 applies to Spread products, so that these markets can also be safeguarded. In one embodiment, the system 500 may check Trade Prices, so that Velocity Logic can detect events accurately.

In one embodiment, the system 500 checks the Arriving Order Limit Prices, so that the system can detect events accurately. For example:
VL Value=10, VL Ref Value Hi=100 Lo=100, VL Range is 90 to 110
Test 1
Ask 1 @109.0
Bid 1@ 111.0
w/o VL, Trade occurs 1 @109.00
w/VL LMT price check, VL Event occurs
Test 2
Ask 1 @109.0
Bid 2@ 111.0
w/o VL, Trade occurs 1 @109.00, 1 @111.0 rests, C.Last 111.0
w/VL LMT price check, VL Event occurs
Test 3
Ask 1 @109
Ask 1@111
Bid 2@ 111
w/o VL, Trade 1@109, Trade 1@111
w/VL LMT price check, VL Event occurs
Test 4
Bid 1@112
w/o VL, 1@112 rests
w/VL LMT price check, VL Event occurs In one embodiment, the system 500 checks MKT-Protect and STP-Protect prices, so that the system 500 can detect events accurately.

In one embodiment, the system 500 is configurable so that the system 500 can be adapted to meet the needs of different markets.
VL Warning Value—the price range the market is allowed to move before an alert is generated. Configuration is needed to enable/disable and specify the numeric value.
Iteration—similar to Stop Logic ("SPL"); the number of iterations a Velocity Logic action should occur before the market is allowed to reopen.
Reserve Time—the length of time a Velocity Logic Iteration will last. Config is needed for Regular and Extended hours.
Reserve Group—when enabled, the ability to have a Velocity Logic action apply to the instrument and its group.

In one embodiment, the system 500 may include a user interface (not shown) coupled with the processor 502 such as may be implemented via the display 414 and user input device 416 which allows the Configurations to be viewed so that the correct values can be verified for each market, new Configurations to be created, entirely or based on Stop Logic Configuration values, modify configurations prior to or during operation of the system 500, delete configurations, or combinations thereof.

In one embodiment, Velocity Logic Events may extend when the time has elapsed and the market is outside a value from the starting price, so that a market does not reopen very far away from the Reference Value. In one embodiment, a Velocity Logic Event may end when a time has elapsed, so that the Market can resume normal trading. In one embodiment, a Velocity Logic Event may end after a configured number of extensions, so that the Market can resume normal trading.

When a qualifying event has been determined, as noted above, the disclosed embodiments may take, or otherwise cause, an action to occur. This action may include alerting the operator of the electronic trading system or exchange computing system, such as the GCC of the CME, placing the market in a reserved state whereby orders may be received and price discovery may occur but matching of trades is otherwise suspended, or institute one or more temporary or permanent limits, such as price limits, e.g. a maximum price and/or minimum price, wherein only trades at prices within the limit(s) are allowed, or combinations thereof. In an alternate embodiment, other actions may include enabling additional liquidity, i.e. trading opportunities, for the particular product, such as by temporarily or permanently enabling implied opportunities whereby, for example, additional liquidity may be found in markets for combination products, e.g. spreads, involving the particular product.

It should be appreciated that when a data object (e.g., representative of a market in an electronic trading system), is placed in a reserved state, the exchange computing system continues receiving messages for the data object but suspends matching messages with other resting messages.

In one embodiment, the velocity detection and mitigation system may check each subject message against multiple threshold values. For example, the operator of the exchange, such as the GCC of the CME, may define all types of events to detect in terms of change in value over a number of time slices. For example, an operator or administrator may define three different value changes over time slices (e.g., buckets) to detect for a product. For example, an operator may desire to detect any incoming value that moves the market for a product by (1) 5 ticks in one millisecond; (2) 8 ticks in 2 milliseconds; or (3) 15 ticks in 5 milliseconds. Any subject message that is then checked would be checked against each of three different thresholds. A subject message that falls outside of threshold values for any one of the three checks would cause the exchange computing system to place the market in reserve for the data object representing the product.

Figure 7:
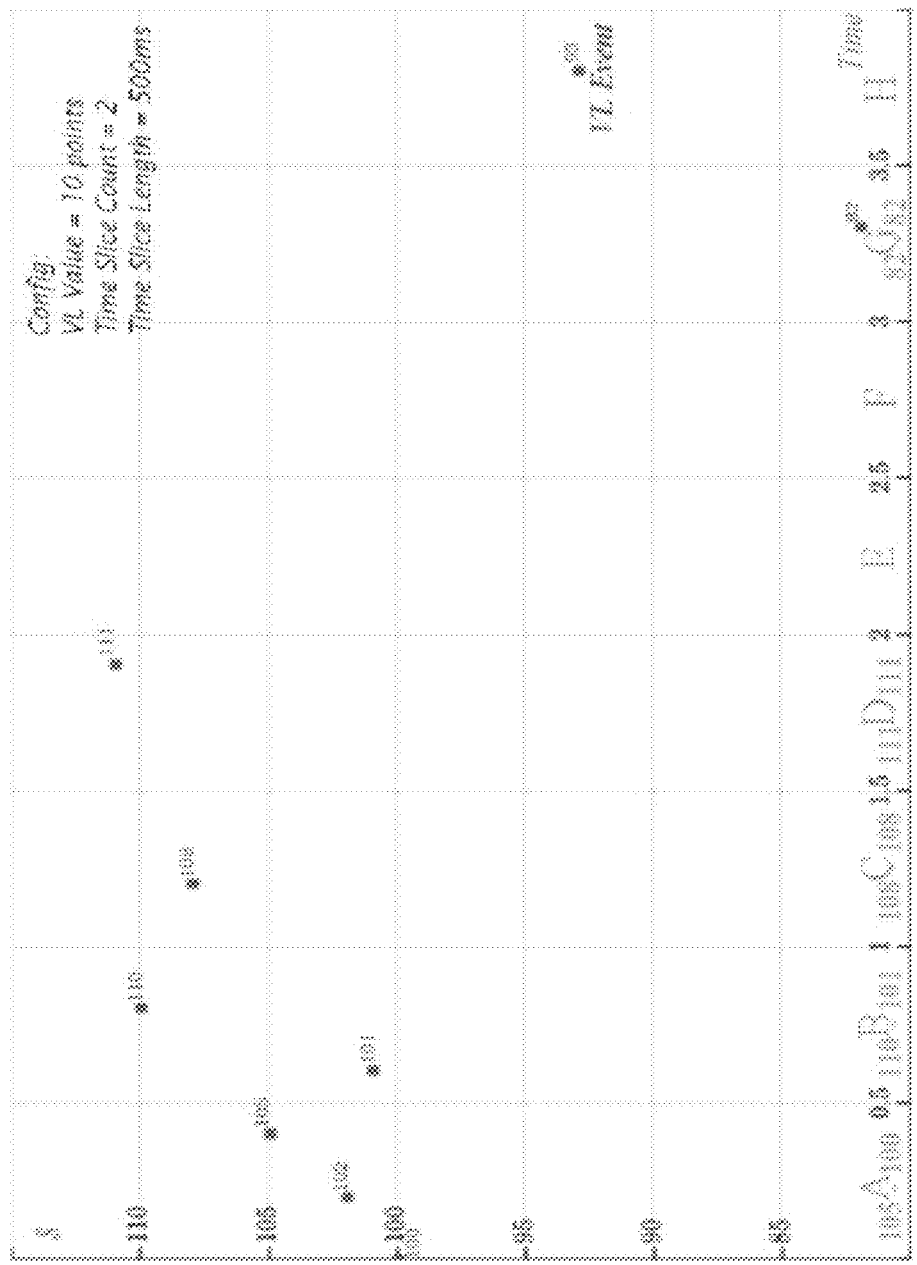
FIG. 7 depicts an example of an event detected according to an example of the disclosed embodiments.

FIG. 7 illustrates an example plot showing an incoming message value 93 that falls outside of defined threshold range after performing the requisite comparisons and accordingly raises, e.g., an action such as placing the market for the product in a reserved state.

The exchange computing system is typically configured to process incoming messages as discussed herein with reference to FIG. 1B. However, if the exchange computing system receives an order or message to trade product at a value or price that violates the conditions defined herein, the disclosed embodiments may take, or otherwise cause, a different action. This action may include alerting the operator of the electronic trading system or exchange, such as the GCC of the CME, placing the market in a reserved state whereby orders may be received and price discovery may occur but matching of trades is otherwise suspended, or institute one or more temporary or permanent limits, such as price limits, e.g. a maximum price and/or minimum price, wherein only trades at prices within the limit(s) are allowed, or combinations thereof. In an alternate embodiment, other actions may include enabling additional liquidity, i.e. trading opportunities, for the particular product, such as by temporarily or permanently enabling implied opportunities whereby, for example, additional liquidity may be found in markets for combination products, e.g. spreads, involving the particular product.

With respect to placing the market in a reserved or paused state, while an instrument may not trade when it is reserved, price discovery may still occur, e.g. an indicative opening price of that instrument may be derived and disseminated to the market. The indicative opening price may reflect the price the instrument would be trading at if the market were open. Placing an instrument in a reserved state allows market participants to enter additional orders that adjust the indicative opening price to a level that reflects buyers competing with other buyers and sellers vying against other sellers. The present embodiments may temporarily suspend trading until the market is adjusted within a threshold range, or when a period of time lapses. The period of time may vary in length in relation to the time of day, the product traded, market volatility and/or any other relevant market condition or combination of market conditions. Similarly, the threshold range may vary by the product and/or the time of day. It will be appreciated that the indicative opening price determined when the market is taken out of the reserved state, or a sampled, derived or measured value thereof, may be used as the initial comparative value(s) by the disclosed embodiments as described above upon resumption of trading.

Because market participants may not be aware that a product or an instrument is reserved due to the large volume of messages sent over an electronic trading system or because the market participants are no longer trading, the present system and method also may encompass independent communication systems to convey information, warnings, or alerts about an instrument in a reserved state. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of the state of the market in a narrow timeframe. It will be appreciated that the length of time for which the market may be temporarily held in a reserved state is implementation dependent and may be configurable, statically or dynamically, and further may vary from market to market. Once the market is reopened, or otherwise taken out of reserved state, the disclosed embodiments may be re-enabled to continue monitoring the market as described herein.

It will be appreciated that other systems designed to detect and respond to extreme market changes may respond by merely setting a hard price limit, i.e. minimum or maximum depending upon the direction of the extreme movement, only within which trades are allowed to occur. However, setting either a maximum or minimum price limit and continuing to allow trading may not address the underlying problem which caused the extreme market movement and the market may reverse and undergo an extreme movement away from the set limit, such as due to the reaction of algorithmic trading systems. In contrast, the disclosed embodiments may place the market in a reserved state whereby trades are not allowed but price discovery can still occur. This effectively slows down the market and enables traders to analyze the market and temper their reactions thereto.

In one embodiment, the action may include placement of the market for the product in a reserved state, as was described above, such as for a limited time period which may be configurable and may be a static or dynamic value and may vary among markets. In one embodiment, if during the reserved state additional conditions, such as based on whether the market is recovering to a normal operating state or not as the reserved state is nearing an end, are met, the time limit for staying in reserved state may be extended. Alternatively, or in addition thereto, the action may include transmission of an alert to an operator of the exchange, such as the GCC of the CME, a trader of the product, or a combination thereof. Alerts may be sent as market data. Where the market is placed in a reserved state, the alert may further advise the recipient of this state. A subsequent message may then be sent when the market is taken out of the reserved state or if the reserved state is extended. Alternatively, or in addition thereto, the action may include permanent or temporary enablement of trading opportunities for the product in a different market. For example, implied markets for which the current product may be a leg, etc. may be enabled to create additional matching opportunities, i.e.

additional liquidity. Alternatively, or in addition thereto, the action may include permanent or temporary prevention of trading of the product at a price outside of a price limit, i.e. a ceiling or floor. If the detected extreme movement is downward, the limit may set as a limit below which trading is not allowed, e.g. a floor. Alternatively, if the detected extreme movement of the market is upward, the limit may be set as a limit above which trading is not allowed, e.g. a ceiling. In one embodiment, if orders to trade are subsequently received substantially close to, or at, or otherwise within a threshold of, the limit, the limit may be periodically raised (or lowered), such as after a defined delay period, to gradually allow a market, intent on reaching a particular price, to eventually reach the price in a controlled manner, e.g. the market is slowed down.

Upon reserving the market for a product, the velocity detection and mitigation system may release the market (i.e., resume allowing matching) as described in U.S. Pat. No. 8,924,278 entitled "System and method for controlling markets during a stop loss trigger", the entire disclosure of which is incorporated by reference herein and relied upon. Alternatively, the velocity detection and mitigation system may release the market (i.e., resume allowing matching) as described in the '936 patent.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
controlling a data transaction processing system which maintains a data structure which stores data indicative of a state which characterizes the data transaction processing system, the data transaction processing system operative to automatically process electronic data transaction request messages for a data object as they are received resulting in changes to the data indicative of the state based thereon, including storing data indicative of previously received electronic data transaction request messages to perform a transaction on the data object at a message value and a remaining quantity thereof, the controlling further comprising:
receiving, by a processor from an external source via an electronic communications network, an electronic data transaction request message to perform a transaction on the data object, the electronic data transaction request message including a message value and a quantity;
accessing the data structure by the processor based on the received electronic data transaction request message to determine the state of the data transaction processing system;
determining, automatically by the processor based on the state, whether the received electronic data transaction request message is counter to a previously received electronic data transaction request and, based thereon, how much of the quantity of the received electronic data transaction request message would be fulfilled by the remaining quantity of the previously received electronic data transaction request if a transaction were completed by the data transaction processing system there between and thereby resulting in a change in the state of the data transaction processing system;

after automatically determining that none of the quantity of the received electronic data transaction request message would be fulfilled, assigning the message value as a comparison value;

after automatically determining that only some of the quantity of the received electronic data transaction request message would be fulfilled, assigning the message value of the received electronic data transaction request message and the message value of the previously received electronic data transaction request as comparison values;

after automatically determining that all of the quantity of the received electronic data transaction request message would be fulfilled, assigning the message value of the previously received electronic data transaction request as the comparison value;

identifying, by the processor, a first comparative value of the data object after an elapse of a first duration of time; and for at least one of the comparison values, determining, by the processor, that a first difference between the comparison value and the first comparative value deviates from a first threshold value;

identifying, by the processor based on the determination that the first difference does not deviate from the first threshold value, a second comparative value of the data object upon an elapse of a second duration of time, the second comparative value being different from the first comparative value;

for at least one of the comparison values, determining, by the processor, that a second difference between the comparison value and the second comparative value deviates from a second threshold value; and performing, automatically by the processor, an action to control the data transaction processing system, based on the determination that the first or second difference deviates from the first or second threshold values, wherein the action comprises automatically halting, by the processor, processing of electronic data transaction request messages received for the data object by the data transaction processing system to determine, whether the received electronic data transaction request message is counter to a previously received electronic data transaction request so as to prevent a subsequent change in the state of the data transaction processing system caused by subsequently received electronic data transaction request messages.

2. The computer implemented method of claim 1, wherein more than one comparison value exists, wherein the computer implemented method further includes initially performing the determining that the first difference between the comparison value and the first comparative value deviates from the first threshold value with the comparison value that is furthest from the message value and repeating the determining that the first difference between the comparison value and the first comparative value deviates from the first threshold value for the next furthest comparison value until one of (a) an action is performed, or (b) the determining that the first difference between the comparison value and the first comparative value deviates from the first threshold value has been performed for all of the comparison values.

3. The computer implemented method of claim 2, wherein the transaction is to one of purchase or relinquish a product associated with the data object and the comparison value that is furthest from the message value is the comparison value that is one of a smallest or a largest compared to the message value.

4. The computer implemented method of claim 1, wherein more than one comparison value exists, wherein the computer implemented method further includes initially performing the determining that the second difference between the comparison value and the second comparative value deviates from the second threshold value with the comparison value that is furthest from the message value and repeating the determining that the second difference between the comparison value and the second comparative value deviates from the second threshold value for the next furthest comparison value until one of (a) an action is performed, or (b) the determining that the second difference between the comparison value and the second comparative value deviates from the second threshold value has been performed for all of the comparison values.

5. The computer implemented method of claim 4, wherein the transaction is to one of purchase or relinquish a product associated with the data object and the comparison value that is furthest from the message value is the comparison value that is one of smallest or largest compared to the message value.

6. The computer implemented method of claim 1, wherein the action further comprises automatically halting, by the processor, processing of electronic data transaction request messages received for the data object by the data transaction processing system to determine, whether the received electronic data transaction request message is counter to a previously received electronic data transaction request until a pre-determined condition is satisfied.

7. The computer implemented method of claim 6, wherein the pre-determined condition is a passage of a pre-determined amount of time after receiving the electronic data transaction request message.

8. The computer implemented method of claim 6, wherein the pre-determined condition is receiving a pre-determined number of subsequent electronic data transaction request messages to perform transactions on the data object after receiving the electronic data transaction request message.

9. The computer implemented method of claim 6, further comprising resuming, after the pre-determined condition is satisfied, processing of electronic data transaction request messages received for the data object.

10. The computer implemented method of claim 1, wherein the first and second durations of time are different.

11. The computer implemented method of claim 1, wherein the first and second threshold values are different.

12. The computer implemented method of claim 1, wherein identifying the first or second comparative values comprises determining one or more of: a minimum value of the data object over the first or second durations of time, respectively; a maximum value of the data object over the first or second durations of time, respectively; or an average of the value of the data object over the first or second durations of time, respectively.

13. The computer implemented method of claim 1, wherein the data transaction processing system is an exchange computing system, and wherein the data object represents a financial instrument traded in the exchange computing system.

14. The computer implemented method of claim 1, wherein the comparative value comprises a bid price of the financial instrument, an ask price of the financial instrument, a last traded price of the financial instrument, a last traded quantity of the financial instrument, a volatility of the financial instrument, a market attribute, or a combination thereof.

15. A computer system including a computer processor coupled with a memory, the computer processor specifically configured to:
  control a data transaction processing system which maintains a data structure which stores data indicative of a state which characterizes the data transaction processing system, the data transaction processing system operative to automatically process electronic data transaction request messages for a data object as they are received resulting in changes to the data indicative of the state based thereon, including storage of data indicative of previously received electronic data transaction request messages to perform a transaction on the data object at a message value and a remaining quantity thereof, the controlling further comprising:
    receive, from an external source via an electronic communications network, an electronic data transaction request message to perform a transaction on the data object, the electronic data transaction request message having a message value and a quantity;
    access the data structure based on the received electronic data transaction request message to determine the state of the data transaction processing system;
    determine, automatically based on the state, whether the received electronic data transaction request message is counter to a previously received electronic data transaction request and, based thereon, how much of the quantity of the received electronic data transaction request message would be fulfilled by the remaining quantity of the previously received electronic data transaction request if a transaction were completed by the data transaction processing system there between and thereby resulting in a change in the state of the data transaction processing system;
    after automatically determining that none of the quantity of the received electronic data transaction request message would be fulfilled, assign the message value as a comparison value;
    after automatically determining that only some of the quantity of the received electronic data transaction request message would be fulfilled, assign the message value of the received electronic data transaction request message and the message value of the previously received electronic data transaction request as comparison values;
    after automatically determining that all of the quantity of the received electronic data transaction request message would be fulfilled, assign the message value of the previously received electronic data transaction request as the comparison value;
    identify a first comparative value of the data object after an elapse of a first duration of time; and
    for at least one of the comparison values, determine that a first difference between the comparison value and the first comparative value deviates from a first threshold value;
    identify, based on the determination that the first difference does not deviate from the first threshold value, a second comparative value of the data object upon an elapse of a second duration of time, the second comparative value being different from the first comparative value;
    for at least one of the comparison values, determine that a second difference between the comparison value and the second comparative value deviates from a second threshold value; and
    perform, automatically, an action to control the data transaction processing system, based on the determination that the first or second difference deviates from the first or second threshold values, wherein the action comprises automatically halting processing of electronic data transaction request messages received for the data object by the data transaction processing system to determine, whether the received electronic data transaction request message is counter to a previously received electronic data transaction request so as to prevent a subsequent change in the state of the data transaction processing system caused by subsequently received electronic data transaction request messages.

16. The computer system of claim 15, wherein more than one comparison value exists and the computer processor is further specifically configured to, initially perform the determining that the first difference between the comparison value and the first comparative value deviates from the first threshold value with the comparison value that is furthest from the message value and repeat the determining that the first difference between the comparison value and the first comparative value deviates from the first threshold value for the next furthest comparison value until one of
  (a) an action is performed, or
  (b) the determining that the first difference between the comparison value and the first comparative value deviates from the first threshold value has been performed for all of the comparison values.

17. The computer system of claim 16, wherein the transaction is to one of purchase or relinquish a product associated with the data object and the comparison value that is furthest from the message value is the comparison value that is one of a smallest or a largest compared to the message value.

18. The computer system of claim 15, wherein more than one comparison value exists and the computer processor is further specifically configured to initially perform the determining that the second difference between the comparison value and the second comparative value deviates from the second threshold value with the comparison value that is furthest from the message value and repeat the determining that the second difference between the comparison value and the second comparative value deviates from the second threshold value for the next furthest comparison value until one of
  (a) an action is performed, or
  (b) the determining that the second difference between the comparison value and the second comparative value deviates from the second threshold value has been performed for all of the comparison values.

19. The computer system of claim 18, wherein the transaction is to one of purchase or relinquish a product associated with the data object and the comparison value that is furthest from the message value is the comparison value that is one of a smallest or largest compared to the message value.

20. The computer system of claim 15, wherein the action further comprises automatically halting, by the processor, processing of electronic data transaction request messages received for the data object by the data transaction processing system to determine, whether the received electronic data transaction request message is counter to a previously received electronic data transaction request until a pre-determined condition is satisfied.

21. The computer system of claim 20, wherein the pre-determined condition is a passage of a pre-determined amount of time after receiving the electronic data transaction request message.

22. The computer system of claim 20, wherein the pre-determined condition is receiving a pre-determined number of subsequent electronic data transaction request messages to perform transactions on the data object after receiving the electronic data transaction request message.

23. The computer system of claim 20, wherein the computer processor is further specifically configured to, when the pre-determined condition is satisfied, resuming processing of electronic data transaction request messages received for the data object.

24. The computer system of claim 15, wherein the first and second durations of time are different.

25. The computer system of claim 15, wherein the first and second threshold values are different.

26. The computer system of claim 15, wherein identifying the first or second comparative values comprises determining one or more of: a minimum value of the data object over the first or second durations of time, respectively; a maximum value of the data object over the first or second durations of time, respectively; or an average of the value of the data object over the first or second durations of time, respectively.

27. The computer system of claim 15, wherein the data transaction processing system is an exchange computing system, and wherein the data object represents a financial instrument traded in the exchange computing system.

28. The computer system of claim 15, wherein the comparative value comprises a bid price of the financial instrument, an ask price of the financial instrument, a last traded price of the financial instrument, a last traded quantity of the financial instrument, a volatility of the financial instrument, a market attribute, or a combination thereof.

29. A computer system comprising:
  means for controlling a data transaction processing system which maintains a data structure which stores data indicative of a state which characterizes the data transaction processing system, the data transaction processing system operative to automatically process electronic data transaction request messages for a data object as they are received resulting in changes to the data indicative of the state based thereon, including storing data indicative of previously received electronic data transaction request messages to perform a transaction on the data object at a message value and a remaining quantity thereof, the controlling further comprising:
    means for receiving, from an external source via an electronic communications network, an electronic data transaction request message to perform a transaction on the data object, the electronic data transaction request message having a message value and a quantity;
  means for accessing the data structure based on the received electronic data transaction request message to determine the state of the data transaction processing system;
  means for determining, automatically based on the state, whether the received electronic data transaction request message is counter to a previously received electronic data transaction request and, based thereon, how much of the quantity of the received electronic data transaction request message would be fulfilled by the remaining quantity of the previously received electronic data transaction request if a transaction were completed by the data transaction processing system there between and thereby resulting in a change in the state of the data transaction processing system;
  after automatically determining that none of the quantity of the received electronic data transaction request message would be fulfilled, means for assigning the message value as a comparison value;
  after automatically determining that only some of the quantity of the received electronic data transaction request message would be fulfilled, means for assigning the message value of the received electronic data transaction request message and the message value of the previously received electronic data transaction request as comparison values;
  after automatically determining that all of the quantity of the received electronic data transaction request message would be fulfilled, means for assigning the message value of the previously received electronic data transaction request as the comparison value;
  means for identifying a first comparative value of the data object after an elapse of a first duration of time; and
  for at least one of the comparison values, determining, by the processor, that a first difference between the comparison value and the first comparative value deviates from a first threshold value;
  means for identifying, based on the determination that the first difference does not deviate from the first threshold value, a second comparative value of the data object upon an elapse of a second duration of time, the second comparative value being different from the first comparative value;
  for at least one of the comparison values, means for determining that a second difference between the comparison value and the second comparative value deviates from a second threshold value; and
  means for performing, automatically, an action to control the data transaction processing system, based on the determination that the first or second difference deviates from the first or second threshold values, wherein the action comprises automatically halting, by the processor, processing of electronic data transaction request messages received for the data object by the data transaction processing system to determine, whether the received electronic data transaction request message is counter to a previously received electronic data transaction request so as to prevent a subsequent change in the state of the data transaction processing system caused by subsequently received electronic data transaction request messages.

30. A computer system comprising:

a processor and a memory coupled therewith, the memory storing computer readable instructions that when executed by the processor, cause the processor to control a data transaction processing system which maintains a data structure which stores data indicative of a state which characterizes the data transaction processing system, the data transaction processing system being operative to automatically processes electronic data transaction request messages for a data object as they are received resulting in changes to the data indicative of the state based thereon, including storing data indicative of previously received electronic data transaction request messages to perform a transaction on the data object at a message value and a remaining quantity thereof, and to further implement:

- an electronic data transaction request message receiver that receives, from an external source via an electronic communications network, an electronic data transaction request message to perform a transaction on the data object, the electronic data transaction request message including a message value and a quantity;
- a match detector coupled with the electronic data transaction request message receiver that accesses the data structure based on the received electronic data transaction request message to determine the state of the data transaction processing system and automatically detects, based on the state, that the received electronic data transaction request message is counter to a previously received electronic data transaction request and, based thereon, how much of the quantity of the received electronic data transaction request message would be fulfilled by the remaining quantity of the previously received electronic data transaction request if a transaction were completed by the data transaction processing system there between and thereby resulting in a change in the state of the data transaction processing system, and assigns one or more of the message value of the received electronic data transaction request message or previously received electronic data transaction request message as comparison values;
- a comparative value identifier coupled with the match detector that identifies at least two comparative values of the data object;
- a difference calculator coupled with the comparative value identifier that calculates a first difference between at least one of the comparison values and a first of the at least two comparative values;
- a deviation calculator coupled with the difference calculator that calculates that the first difference deviates from a first threshold value; and
- wherein when the first difference does not deviate from the first threshold value, the difference calculator calculates a second difference between at least one of the comparison values and a second of the at least two comparative values and the deviation calculator calculates that the second difference deviates from a second threshold value; and
- an action executor coupled with the deviation calculator that automatically executes an action to control the data transaction processing system after one of the first or second differences deviates from the first or second threshold values, wherein the action comprises automatically halting, by the processor, processing of electronic data transaction request messages received for the data object by the data transaction processing system to determine, whether the received electronic data transaction request message is counter to a previously received electronic data transaction request so as to prevent a subsequent change in the state of the data transaction processing system caused by subsequently received electronic data transaction request messages.

* * * * *